United States Patent
Katagiri et al.

(10) Patent No.: US 7,218,213 B2
(45) Date of Patent: May 15, 2007

(54) ALARM SYSTEM, ALARM CONTROL APPARATUS AND ALARM CONTROL PROGRAM

(75) Inventors: Taku Katagiri, Kawasaki (JP);
Tomonobu Takashima, Kawasaki (JP);
Masatoshi Tohno, Kawasaki (JP);
Daisuke Ueno, Kawasaki (JP); Tadao Omi, Kawasaki (JP); Hisao Ito, Oita (JP); Kozo Baba, Oita (JP); Akiyoshi Tafuku, Oita (JP)

(73) Assignee: Fujitsu Limited, Kawasaki (JP)

( * ) Notice: Subject to any disclaimer, the term of this patent is extended or adjusted under 35 U.S.C. 154(b) by 107 days.

(21) Appl. No.: 11/135,431

(22) Filed: May 24, 2005

(65) Prior Publication Data
US 2005/0219058 A1 Oct. 6, 2005

Related U.S. Application Data

(63) Continuation of application No. PCT/JP2003/06148, filed on May 16, 2003.

(51) Int. Cl.
*B60Q 1/54* (2006.01)
(52) U.S. Cl. ............... 340/466; 340/575; 340/576; 340/436; 340/439; 340/903; 701/45
(58) Field of Classification Search .......... 340/466, 340/575, 576, 436, 439, 903; 701/45
See application file for complete search history.

(56) References Cited

U.S. PATENT DOCUMENTS

| | | | | |
|---|---|---|---|---|
| 5,432,509 A | * | 7/1995 | Kajiwara | 340/903 |
| 5,465,079 A | * | 11/1995 | Bouchard et al. | 340/576 |
| 5,813,989 A | * | 9/1998 | Saitoh et al. | 600/484 |
| 6,366,207 B1 | * | 4/2002 | Murphy | 340/576 |
| 6,731,925 B2 | * | 5/2004 | Naboulsi | 455/345 |
| 7,054,723 B2 | * | 5/2006 | Seto et al. | 701/1 |
| 2002/0044048 A1 | * | 4/2002 | Watanabe et al. | 340/436 |
| 2004/0070509 A1 | * | 4/2004 | Grace et al. | 340/575 |

FOREIGN PATENT DOCUMENTS

| | | |
|---|---|---|
| JP | 03-167698 | 7/1991 |
| JP | 07-057172 | 3/1995 |
| JP | 2001-138767 | 5/2001 |
| JP | 2002-219968 | 8/2002 |

* cited by examiner

*Primary Examiner*—Jeffery Hofsass
*Assistant Examiner*—Edny Labbees
(74) *Attorney, Agent, or Firm*—Staas & Halsey LLP

(57) ABSTRACT

An alarm system includes a miniature camera (10), a loudspeaker (20), a vehicle speed sensor (30), a longitudinal G sensor (40), a lateral G sensor (50) and an on-vehicle unit (60). A CPU (60*a*) of the on-vehicle unit (60) executes respective programs (61)–(64) in a ROM (60*h*), thereby outputting, if a traveling distance during a period for which a driver D continues to take an abnormal behavior exceeds a predetermined value when a traveling state of an automobile is kept stable, an alarm corresponding to a magnitude of the excess over the predetermined value from the loudspeaker (20). The alarm system is thus configured and is therefore capable of exactly outputting the alarm when a danger actually rises.

20 Claims, 14 Drawing Sheets

ALARM SYSTEM

| ALARM RANK | FIRST LEVEL COUNT | SECOND LEVEL COUNT | THIRD LEVEL COUNT |
|---|---|---|---|
| 1 | 1 | 0 | 0 |
| 2 | 2 | 1 | 0 |
| 3 | 3 | 2 | 1 |
| 4 | 4 | 3 | 2 |
| 5 | 5 | 4 | 3 |

RANK DEFINITION TABLE

ALARM SYSTEM, ALARM CONTROL APPARATUS AND ALARM CONTROL PROGRAM

This application is a continuing application, filed under 35 U.S.C. §111(a), of International Application PCT/JP2003/06148, filed May 16, 2003.

TECHNICAL FIELD

The present invention relates to an alarm system for notifying an operator of a vehicle of a purport that a behavior of the operator is unsuited to the operation, an alarm control apparatus for making this alarm system function in the vehicle, and an alarm control program for making a computer function as this alarm control apparatus.

BACKGROUND ARTS

As known well, an operator of the vehicle such as a passenger car, a truck, a two-wheeled vehicle, a train, a ship, an airplane, etc., is unable to, if the operator's eyes are closed in a way that falls into drowsiness and dozes off or if the axis of sight deviates (from the road) for looking a night scene or manipulating a switch on an instrument panel, an audio system and a cellular phone during the operation, observe a forward situation. If unable to observe the forward situation during the operation, the operator cannot take action of avoiding a danger, and hence there is a high possibility of causing an accident. Therefore, some companies proposed a good number of alarm systems for outputting an alarm from a loudspeaker, a monitor and a light emitting diode lamp when the operator takes an abnormal behavior unsuited to the operation.

In many of those conventional alarm systems, factors (such as closed eye, looking-aside and meandering driving) for judging the abnormal behavior are converted into numerical values, and a hazard state is judged if the factor value exceeds a predetermined threshold value, thereby outputting an alarm. Further, a recent alarm system is that if an abnormal behavior state with the factor value exceeding the predetermined threshold value continues for a fixed period of time, and the alarm is outputted (refer to, e.g., Patent documents 1 through 3).

Patent Document 1

Japanese Patent Application Laid-Open Publication No. 2002-219968 (paragraph 0012)

Patent Document 2

Japanese Patent Application Laid-Open Publication No. 2001-138767 (paragraph 0037)

Patent Document 3

Japanese Patent Application Laid-Open Publication No. 06-032154 (paragraph 0069)

By the way, if the abnormal behavior is conducted for a fixed period of time when the moving speed of the vehicle is 100 km/h, a hazard level largely differs from a case of conducting the abnormal behavior for the same period of time when the moving speed is 10 km/h. An extremely hazardous state occurs when the moving speed is high as in the former case.

Nevertheless, the conventional alarm system described above simply judges the hazard state when the abnormal behavior state continues over the fixed period of time, and therefore judges the hazard state irrespective of the moving speed of the vehicle, i.e., regardless of the level of the danger. Therefore, in the conventional alarm system, the operator of the vehicle was unable to exactly receive the alarm when the danger actually rises.

It is an object of the present invention, which was devised under such circumstances of the prior arts described above, to provide an alarm system capable of exactly outputting the alarm when the danger actually rises, an alarm control apparatus for making this alarm system function in the vehicle, and an alarm control program for making a computer function as this alarm control apparatus.

DISCLOSURE OF THE INVENTION

An alarm system of the present invention configured to obviate the problems given above comprises a behavior detecting module for detecting an abnormal behavior from behaviors of an operator sitting on an operation seat of a vehicle, a distance measuring module for measuring a moving distance of the vehicle while the abnormal behavior of the operator continues to be detected by the behavior detecting module, a hazard state judging module for judging that a state is a hazard state when the moving distance measured by the distance measuring module exceeds a threshold value, and an alarm output module for outputting an alarm when the hazard state judging module judges that the state is the hazard state.

Thus, in the case of adopting the moving distance of the vehicle during the period for which the abnormal behavior state continues as a condition for judging whether the state is the hazard state or not, the threshold value of the moving distance is fixed, and hence it follows that a limit period of time enabling the continuation of the abnormal behavior to be allowed, changes linearly corresponding to the moving speed of the vehicle. Therefore, as the moving speed of the vehicle becomes higher, the hazard state is judged simply by taking the abnormal behavior for a shorter period of time. When the moving speed of the vehicle is low, the hazard state is not judged unless the abnormal behavior is taken for a comparatively long period of time. Accordingly, the operator of the vehicle can exactly receive the alarm when the danger actually rises.

Note that in the alarm system of the present invention, the hazard state judging module uses the moving distance during the continuation of the abnormal behavior as the condition for judging the hazard state, however, the elapse time during the continuation of the abnormal behavior may be added to the hazard state judging condition in order to supplement this judging condition. With this contrivance, there decreases the time till a more hazardous state occurs as the moving speed of the vehicle becomes higher, and there is uniformly determined the time till the hazard state is judged when the moving speed of the vehicle gets equal to or lower than a fixed speed, i.e., when the elapse time exceeds the threshold value.

Moreover, in the alarm system of the present invention, the hazard state judging module may judge whether or not the state is the hazard state irrespective of the state of the vehicle, and may also judge whether or not the state is the hazard state only when the state of the vehicle is the stable state. In the latter case, an unnecessary alarm is not outputted when the vehicle stops and when moving in a non-stable state. Note that whether the state of the vehicle is stable state or not can be judged from a moving speed, a longitudinal acceleration, a lateral acceleration, a yaw rate, a pitch rate, a roll rate, a steering angle, a gas injection quantity, an accelerator stroke, a brake pedal treading quantity, etc. of the vehicle, however, it is desirable to judge the state of the vehicle on the basis of at least three of these moving state elements.

Further, in the alarm system of the present invention, the hazard state judging module may have one single threshold value with respect to the moving distance and may also have a multiplicity of threshold values different in their magnitude from each other. In the latter case, when judging whether the state is the hazard state or not, a hazard level corresponding to a magnitude of the excess of the moving distance over the threshold value can be specified from within the multiplicity of hazard levels. With this contrivance, the alarm output module can change the alarm output level corresponding to the hazard level. This contrivance enables the operator to recognize a purport of being in the hazard state and simultaneously recognize how much the danger is high.

Moreover, in the alarm system of the present invention, the hazard state judging module may have a single threshold value with respect to the elapse time and may also have a multiplicity of threshold values different in their magnitude from each other. In the latter case, when judging whether the state is the hazard state or not, a hazard level corresponding to a magnitude of the excess of the moving distance over the threshold value can be specified from within the multiplicity of threshold values, a hazard level corresponding to a magnitude of the excess of the elapse time over the threshold value can be specified from within the multiplicity of threshold values, and the higher of these specified hazard levels can be specified. With this contrivance, the alarm output module can change the alarm output level corresponding to the hazard level.

Still further, in the alarm system of the present invention, the behavior detecting module, when detecting the abnormal behavior, may specify a type of the detected abnormal behavior. The types of the abnormal behaviors can be exemplified such as a closed eye implying a high possibility of operating while dozing off, and looking-aside that implies a deviation of an axis of sight of the operator from a proper axis of sight. In this case, the hazard state judging module, if having the threshold values different corresponding to the types of the abnormal behaviors with respect to the moving distance or the continuous time, when the behavior detecting module specifies the type of the abnormal behavior, can adopt the threshold value corresponding to this specified type.

Yet further, in the alarm system of the present invention, the behavior detecting module may acquire image data from an imaging device for imaging an image of the face of the operator, and may detect the behavior abnormality of the operator for every predetermined number of frames, for example, every one frame of the image data.

Moreover, an alarm control apparatus according to the present invention configured in order to obviate the problems described above, which is incorporated into a vehicle having an operation seat on which an operator sits when operating, and connected to a speed sensor for measuring a moving speed of the vehicle, an imaging device for imaging the operator and an output device, comprises a behavior detecting module for detecting an abnormal behavior of the operator from image data acquired from the imaging device, a distance measuring module for measuring a moving distance of the vehicle while the abnormal behavior of the operator continues to be detected by the behavior detecting module on the basis of the moving speed acquired from the speed sensor, a hazard state judging module for judging that a state is a hazard state when the moving distance measured by the distance measuring module exceeds a threshold value, and an alarm output module for outputting an alarm to the output device when the hazard state judging module judges that the state is the hazard state.

Accordingly, the alarm control apparatus, when connected to the speed sensor, the imaging device and the output device, enables a system equal to the alarm system of the present invention to function in the vehicle.

Yet further, an alarm control program according to the present invention configured for obviating the problems described above serves to make a computer incorporated into a vehicle having an operation seat on which an operator sits when operating, and connected to a speed sensor for measuring a moving speed of the vehicle, an imaging device for imaging the operator and an output device, execute a behavior detecting step of detecting an abnormal behavior of the operator from image data acquired from the imaging device, a distance measuring step of measuring a moving distance of the vehicle while the abnormal behavior of the operator continues to be detected on the basis of the moving speed acquired from the speed sensor, a hazard state judging step of judging that a state is a hazard state when the moving distance obtained by the measurement exceeds a threshold value, and an alarm outputting step of outputting an alarm to the output device only when judging that the state is the hazard state.

Accordingly, the alarm control program enables the computer to function as the alarm control apparatus of the present invention described above.

BEST MODE FOR CARRYING OUT THE INVENTION

A best mode for carrying out the present invention will hereinafter be described with reference to the drawings.

<First Embodiment>

Figure 1:
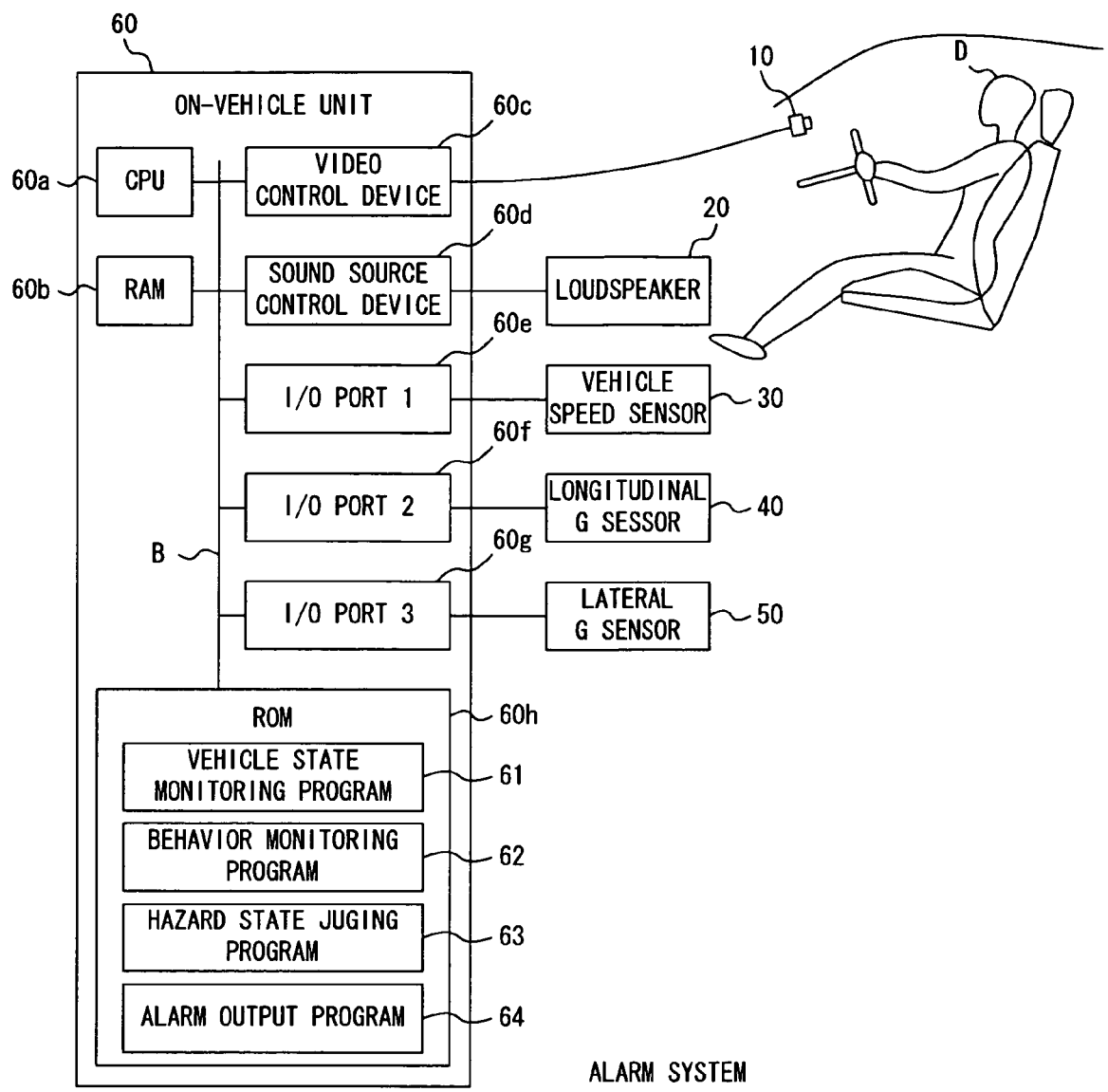
FIG. 1 is a diagram schematically showing an alarm system by way of a first embodiment of the present invention.

FIG. 1 is a diagram schematically showing an alarm system by way of a first embodiment of the present invention. As shown in FIG. 1, the present alarm system includes a miniature camera 10, a loudspeaker 20, a vehicle speed sensor 30, a longitudinal G sensor 40, a lateral G sensor 50 and an on-vehicle unit 60.

The miniature camera 10 is an imaging device provided with an area image sensor and an objective optical system for capturing a time-varying image (dynamic image). The area image sensor coverts an image formed on an imaging surface by light through the objective optical system into image data, and outputs the image data as carried on analog signals. This miniature camera 10 is installed in the periphery of an instrument panel on a dashboard, or in the periphery of a sunvisor or at an A-pillar within a room of an automobile such as a passenger car, a truck, etc. Whichever place the camera 10 is installed, a direction of the miniature camera 10 is adjusted so that a face of a driver D is included by a visual field when sitting on a driver's seat.

The loudspeaker 20 is an output device for converting voice data inputted in the form of the analog signals into voices. The loudspeaker 20 may be an on-vehicle device as a dedicated-to-the-alarm-system loudspeaker mounted on the automobile and may also be a loudspeaker provided as an audio system in the automobile. In the latter case, the voice data are temporarily inputted to an audio system from an external input terminal, and this audio system instructs the self-loudspeaker to output a voice based on the voice data.

The vehicle speed sensor 30 is a detection device for outputting a signal corresponding to a speed of the automobile. The vehicle speed sensor 30 may be an on-vehicle sensor mounted as a dedicated-to-the-alarm-system sensor on the automobile and may also be a speed sensor shared with other systems within the automobile. These other intra-automobile systems are exemplified such as a speed display system (a so-called speed meter) in the instrument panel, an ABS [Antilock Brake System], a TRC [Traction Control] system and a VDC [Vehicle Dynamic Control] system.

The longitudinal G sensor 40 is a detection device for outputting a signal corresponding to a longitudinal directional component of inertial force applied on the automobile (which is the inertial force acting in back-and-forth directions of the automobile). The lateral G sensor 50 is a detection device for outputting a signal corresponding to a component of the inertial force acting in lateral directions (in right-and-left directions of the automobile). These two sensors 40, 50 may be the on-vehicle sensors as those dedicated to the alarm system mounted on the automobile, and may also be the longitudinal G sensor and the lateral G sensor that are shared with other systems within the automobile. These other intra-automobile systems are exemplified such as an active suspension system, the ABS and the VDC system.

The on-vehicle unit 60 is a control device for making the alarm system function on the automobile by utilizing the other devices 10 through 50 described above, and these other devices 10 through 50 are each connected to this on-vehicle unit 60. The on-vehicle unit 60 is accommodated together with, for example, an engine control unit in the periphery of the dashboard described above.

An interior of the on-vehicle unit 60 is provided with a CPU [Central Processing Unit] 60a, a RAM [Random Access Memory] 60b, a video control device 60c, a sound source control device 60d, first through third I/O [Input/Output] ports 60e–60g and a ROM [Read Only Memory] 60h. These hardware components 60a–60h are connected to each other via a bus B.

The CPU 60a is a central processing unit for controlling the whole of the on-vehicle unit 60. The RAM 60b is a main storage device (main memory) on which an operation area is developed when the CPU 60a executes a variety of programs.

The video control device 60c is a device that controls receiving the image data from the miniature camera 10. To be more specific, the video control device 60c effects sampling of the analog signals or the digital signals inputted from the miniature camera 10 at a fixed time interval (an interval of, e.g., 33 ms), and generates the digital image data in a way that compresses a data size for one frame. Further, the video control device 60c sequentially transmits the thus-generated image data to the CPU 60a.

The sound source control device 60d is a device that controls outputting the voice data to the loudspeaker 20. The sound source control device 60d, when receiving the digital signals representing the voice data from the CPU 60a, converts the digital signals into the analog signals, and outputs the analog signals to the loudspeaker 20.

The first I/O port 60e is an in-between device through which the data are transmitted and received between the CPU 60a and the vehicle speed sensor 30. The first I/O port 60e generates speed data of the automobile on the basis of the signals outputted from the vehicle speed sensor 30 at all times, and sequentially updates a content of the self-memory with the speed data. Further, the first I/O port 60e, upon receiving an instruction from the CPU 60a, outputs the speed data in the memory to the CPU 60a.

The second I/O port 60f is an in-between device through which the data are transmitted and received between the CPU 60*a* and the longitudinal G sensor 40. The third I/O port 60*g* is an in-between device through which the data are transmitted and received between the CPU 60*a* and the lateral G sensor 50. Both of the I/O ports 60*f* and 60*g* generate acceleration data of the automobile on the basis of the signals outputted from the G sensors 40 and 50 at all times, and sequentially update contents of the self-memories with these pieces of acceleration data. Moreover, both of the I/O ports 60*f* and 60*g*, upon receiving an instruction from the CPU 60*a*, output the acceleration data in the memories to the CPU 60*a*.

The ROM 60*h* is a recording device recorded with the various items of data and the variety of programs. The ROM 60*h* may be detachably attached to a socket provided inside the on-vehicle unit 60. In this case, the ROM 60*h* attached to the on-vehicle unit 60 can be replaced with a ROM 60*h* recorded with various items of modified data and a variety of updated versions of programs. At this time, the ROM 60*h* functions as a replaceable readable-by-computer medium.

The programs recorded on the ROM 60*h* include a vehicle state monitoring program 61, a behavior monitoring program 62, a hazard state judging program 63 and an alarm output program 64.

Note that the vehicle state monitoring program 61 corresponds to a vehicle state judging module, and the vehicle speed sensor 30, the longitudinal G sensor 40 and the lateral G sensor 50 correspond to a vehicle detecting module. Further, the behavior monitoring program 62 and the miniature camera 10 correspond to a behavior detecting module, and the hazard state judging program 63 corresponds to a distance measuring module, a time measuring module and a hazard state judging module. Moreover, the alarm output program 64 and the loudspeaker 20 correspond to an alarm output module.

The following are sequential explanations of contents of processes executed by the CPU 60*a* in accordance with those programs 61–64.

To start with, when the driver D sitting on the driver's seat in the automobile turns an ignition key, an engine starts being driven, and simultaneously the miniature camera 10, the respective G sensors 40, 50 and the on-vehicle unit 60 are powered on. Hereupon, in the on-vehicle unit 60, the CPU 60*a* reads the four programs 61–64 from the ROM 60*h*, thereby starting the execution of a vehicle state monitoring process, a behavior monitoring process, a hazard state judging process and an alarm output process. Note that these four processes are executed in parallel with each other. Namely, the on-vehicle unit 60 comes to a status where these four processes are generated simultaneously.

<Vehicle State Monitoring Process>

Figure 2:
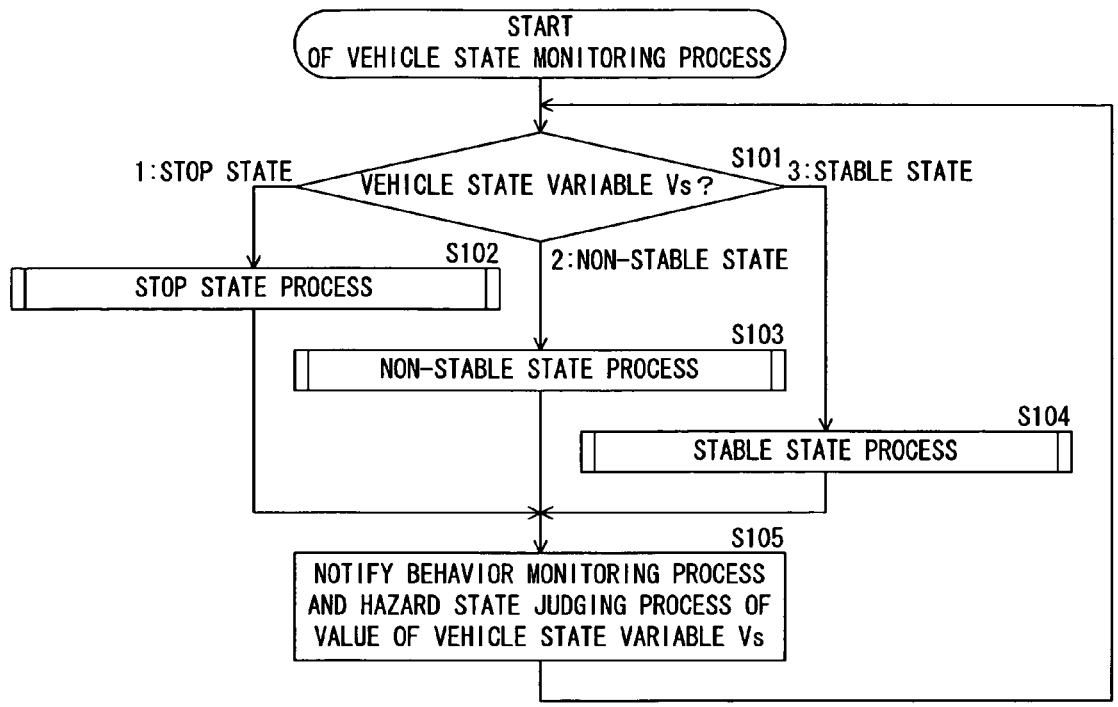
FIG. 2 is an explanatory flowchart of a vehicle state monitoring process executed in an on-vehicle unit of the alarm system.

FIG. 2 is an explanatory flowchart of the vehicle state monitoring process.

After the start of executing the vehicle state monitoring process, in first step S101, the CPU 60*a* judges what value is substituted into a vehicle state variable Vs. Note that the value of the vehicle state variable Vs is set to "1" as an initial value when started. Then, the CPU 60*a*, when the value substituted into the vehicle state variable Vs is "1", infers that a vehicle state is in a stop state and therefore proceeds to a process in step S102.

Figure 3:
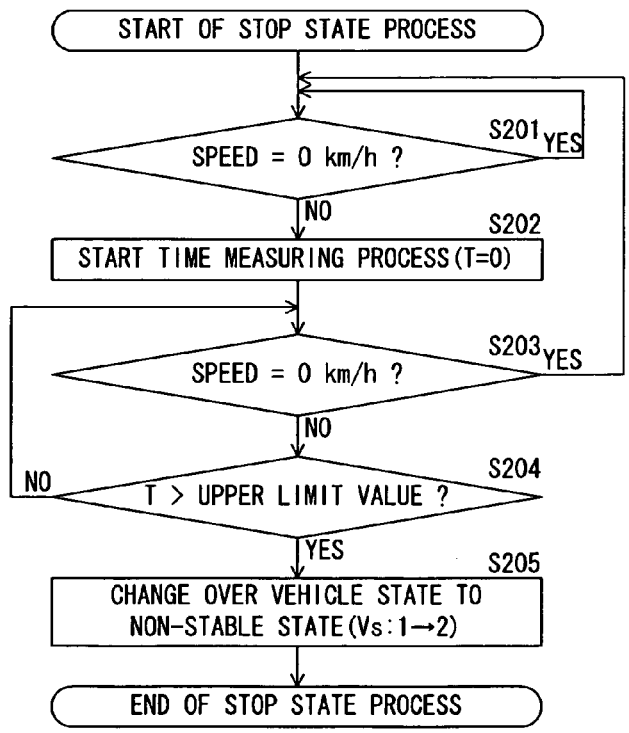
FIG. 3 is an explanatory flowchart of a stop state process executed as a subroutine in the vehicle state monitoring process.

In step S102, the CPU 60*a* reads a stop state subroutine, and starts executing a stop state process. FIG. 3 is an explanatory flowchart of this stop state process.

After starting the execution of the stop state process, in first step S201, the CPU 60*a* monitors the speed data that are sequentially updated in the first I/O port 60*e* and stands by till the speed of the automobile comes to a speed other than 0 km/h. Then, when the speed of the automobile comes to the speed other than 0 km/h, the CPU 60*a* proceeds to a process in step S202.

In step S202, the CPU 60*a* starts a time measuring process. More specifically, the CPU 60*a* starts a process of incrementing a value of a time variable T by predetermined unit second (e.g., 0.01 sec) from "0".

In next step S203, the CPU 60*a* judges whether the speed of the automobile is 0 km/h or not. Then, if the speed of the automobile is not 0 km/h, the CPU 60*a* proceeds to a process in step S204.

In step S204, the CPU 60*a* judges whether or not the value of the time variable T is exceeds a predetermined upper limit value (e.g., 2 sec). Then, if the value of the time variable T is equal to or less than the predetermined upper limit value, the CPU 60*a* returns to the process in step S203.

During the execution of the processing loop of steps S203 and S204, the CPU 60*a*, if the speed of the automobile comes to 0 km/h before the value of the time variable T exceeds the predetermined upper value, returns to the process in S201 from step S203 and, if the value of the time variable T exceeds the predetermined upper value before the speed of the automobile comes to 0 km/h, proceeds to a process in S205 from S204.

In step S205, the CPU 60*a* changes over the vehicle state to a non-stable state from the stop state. To be more specific, the CPU 60*a* changes the value of the vehicle state variable Vs to "2" from "1". Then, the CPU 60*a* finishes executing the stop state process and proceeds to a process in step S105 in the main routine in FIG. 2.

Further, in step S101, if the value substituted into the vehicle state variable V2 is "2", the CPU 60*a* infers that the vehicle state is the non-stable state, and proceeds to a process in step S103.

In step S103, the CPU 60*a* reads a non-stable state subroutine and starts executing a non-stable state process. FIGS. 4 through 7 are explanatory flowcharts of this non-stable state process.

In first step S301 after starting the execution of the non-stable state process, the CPU 60*a* monitors the speed data that are sequentially updated in the first I/O port 60*e*, and judges whether the speed of the automobile is 0 km/h or not. Then, when the speed of the automobile is 0 km/h, the CPU 60*a* proceeds to a process in step S302.

In step S302, the CPU 60*a* starts a time measuring process of incrementing the value of the time variable T by predetermined unit second from "0".

In next step S303, the CPU 60*a* judges whether or not the speed of the automobile is 0 km/h or not. Then, when the speed of the automobile is 0 km/h, the CPU 60*a* proceeds to a process in step S304.

In step S304, the CPU 60*a* judges whether or not a value of a time variable T exceeds a predetermined upper limit value (e.g., 3 sec). Then, if the value of the time variable T is equal to or less than the predetermined upper limit value, the CPU 60*a* returns to the process in step S303.

During the execution of the processing loop of steps S303 and S304, the CPU 60*a*, if the speed of the automobile comes to a speed other than 0 km/h before the value of the time variable T exceeds the predetermined upper limit value, returns to the process in S301 from step S303 and, if the value of the time variable T exceeds the predetermined upper limit value before the speed of the automobile comes to the speed other than 0 km/h, proceeds to a process in S305 from step S304.

In step S305, the CPU 60*a* changes over the vehicle state to the stop state from the non-stable state. To be more specific, the CPU 60a changes the value of the vehicle state variable Vs to "1" from "2". Then, the CPU 60a terminates the execution of the non-stable state process, and proceeds to a process in step S105 in the main routine in FIG. 2.

While on the other hand, in step S301, if the speed of the automobile is not 0 km/h, the CPU 60a proceeds to processes in S306, S311 and S316. Note that a routine in steps S306–S310 shown in FIG. 5, a routine in steps S311–S315 shown in FIG. 6 and a routine in steps S316–S320 shown in FIG. 7 are executed in parallel with each other, and step S321 is executed when finishing all these three routines.

Figure 5:
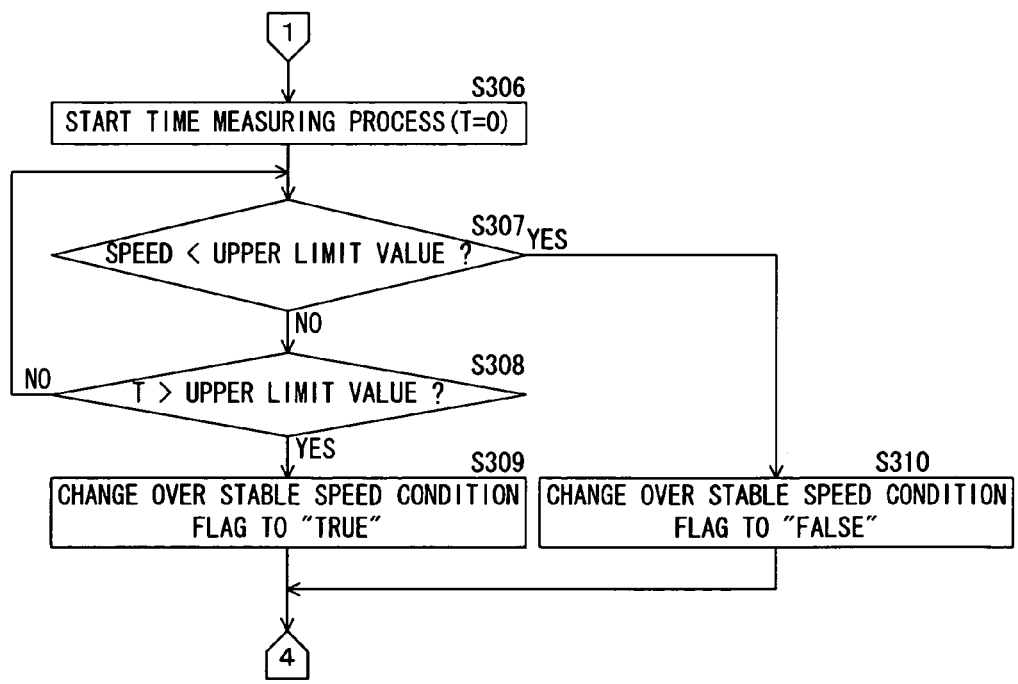
FIG. 5 is an explanatory flowchart of the non-stable state process executed as the subroutine in the vehicle state monitoring process.

In step S306 in FIG. 5, the CPU 60a starts a time measuring process of incrementing the value of the time variable T by predetermined unit second from "0".

In next step S307, the CPU 60a judges whether or not the speed of the automobile is less than a predetermined upper limit value. Note that this upper limit value is a speed condition defined as one of conditions for judging that the vehicle state of the automobile becomes a stable traveling state, and a value of, for instance, 40 km/h is set as this upper limit value. Then, if the speed of the automobile is equal to or higher than the predetermined upper limit value, the CPU 60a proceeds to a process in step S308.

In step S308, the CPU 60a judges whether or not the value of the time variable T exceeds a predetermined upper limit value (e.g., 5 sec). Then, if the value of the time variable T is equal to or less than the predetermined upper limit value, the CPU 60a returns to the process in step S307.

During the execution of the processing loop in steps S307 and S308, if the value of the time variable T exceeds the predetermined upper limit value before the speed of the automobile becomes lower than the predetermined upper limit value, the CPU 60a proceeds to a process in S309 from step S308.

Figure 4:
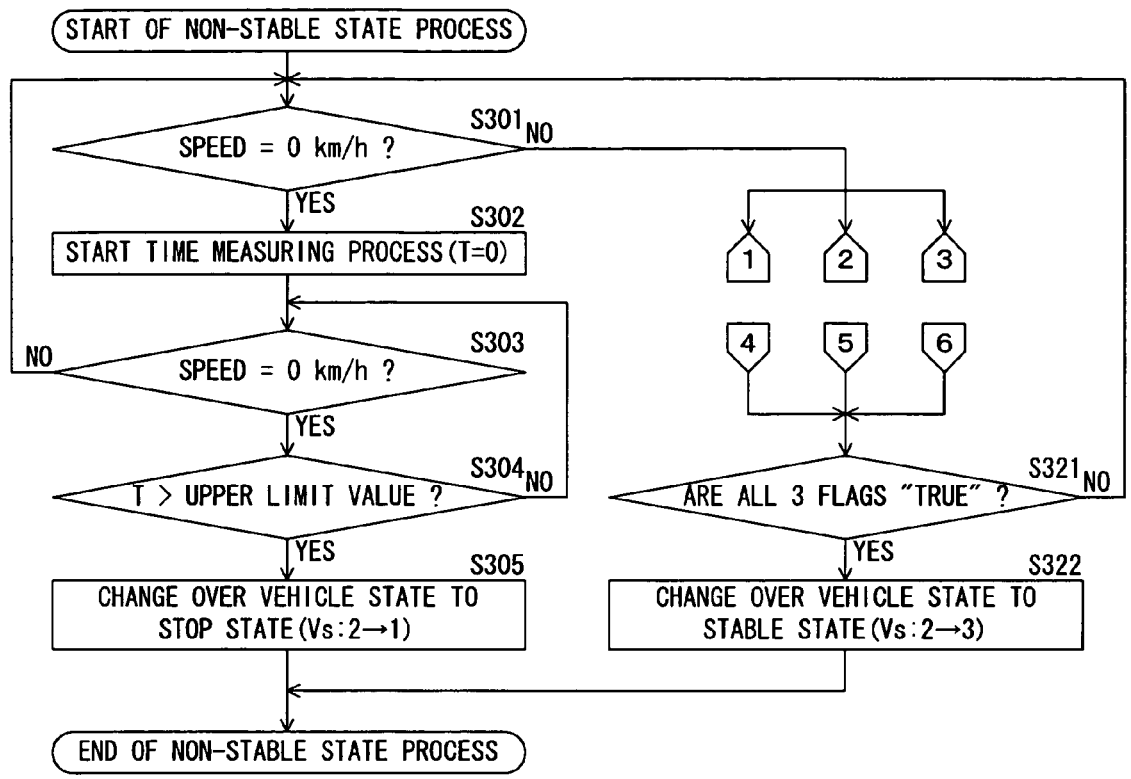
FIG. 4 is an explanatory flowchart of a non-stable state process executed as a subroutine in the vehicle state monitoring process.

In step S309, the CPU 60a changes over a stable speed condition flag to "TRUE", and proceeds to a process in step S321 in FIG. 4.

While on the other hand, during the execution of the processing loop in steps S307 and S308, if the speed of the automobile becomes less than the predetermined upper limit value before the value of the time variable T becomes larger than the predetermined upper limit value, the CPU 60a proceeds to a process in S310 from step S307.

In step S310, the CPU 60a changes over the stable speed condition flag to "FALSE" and proceeds to a process in step S321 in FIG. 4.

Figure 6:
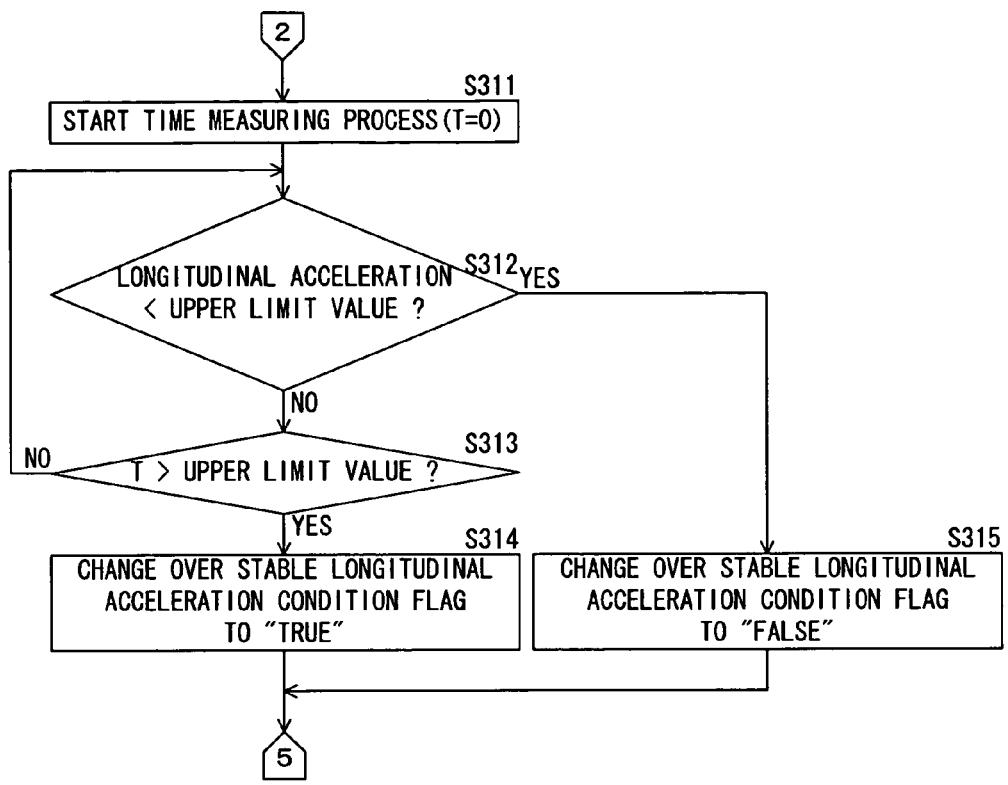
FIG. 6 is an explanatory flowchart of the non-stable state process executed as the subroutine in the vehicle state monitoring process.
Figure 7:
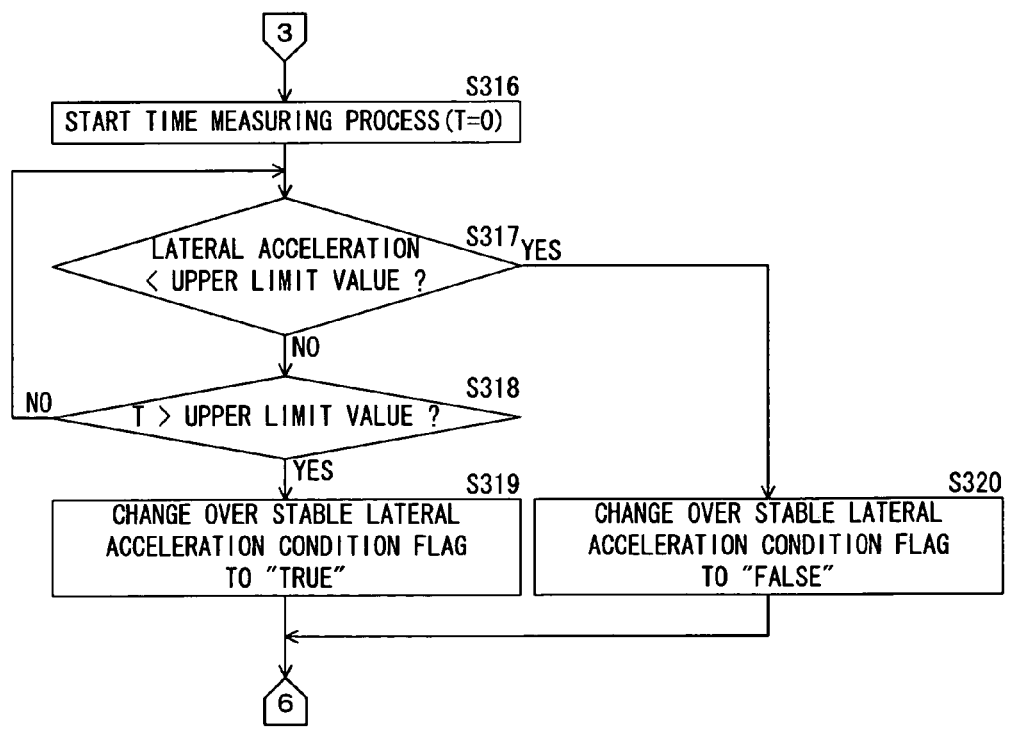
FIG. 7 is an explanatory flowchart of the non-stable state process executed as the subroutine in the vehicle state monitoring process.

Further, in step S311 in FIG. 6, the CPU 60a starts a time measuring process of incrementing the value of the time variable T by predetermined unit second from "0".

In next step S312, the CPU 60a monitors longitudinal acceleration data that are sequentially updated in the second I/O port 60f, and judges whether or not a longitudinal acceleration of the automobile exceeds a predetermined upper limit value. Note that this upper limit value is an acceleration condition defined as one of the conditions for judging that the vehicle state of the automobile becomes the stable traveling state, and a value of, e.g., 1 m/s² is set as this upper limit value. Then, if the longitudinal acceleration of the automobile is equal to a lower than the predetermined upper limit value, the CPU 60a proceeds to a process in step S313.

In step S313, the CPU 60a judges whether or not the value of the time variable T exceeds a predetermined upper limit value (e.g., 5 sec). Then, if the value of the time variable T is equal to or lower than the predetermined upper limit value, the CPU 60a returns to the process in step S312.

During the execution of the processing loop of steps S312 and S313, if the value of the time variable T exceeds the predetermined upper limit value before the longitudinal acceleration of the automobile exceeds the predetermined upper limit value, the CPU 60a proceeds to a process in S314 from step S313.

In step S314, the CPU 60a changes over a stable longitudinal acceleration condition flag to "TRUE", and proceeds to a process in step S321 in FIG. 4.

While on the other hand, during the execution of the processing loop of steps S312 and S313, if the longitudinal acceleration of the automobile exceeds the predetermined upper limit value before the value of the time variable T exceeds the predetermined upper limit value, the CPU 60a proceeds to a process in S315 from step S312.

In step S315, the CPU 60a changes the stable longitudinal acceleration condition flag to "FALSE", and proceeds to a process in step S321 in FIG. 4.

Further, in step S316 in FIG. 7, the CPU 60a starts a time measuring process of incrementing the value of the time variable T by predetermined unit second from "0".

In next step S317, the CPU 60a monitors lateral acceleration data that are sequentially updated in the third I/O port 60g, and judges whether or not a lateral acceleration of the automobile exceeds a predetermined upper limit value. Note that this upper limit value is a curve condition defined as one of conditions for judging that the vehicle state of the automobile becomes the stable traveling state, and a value of, e.g., 0.5 m/s² is set as this upper limit value. Then, if the lateral acceleration of the automobile is equal to or lower than the predetermined upper limit value, the CPU 60a proceeds to a process in step S318.

In step S318, the CPU 60a judges whether or not the value of the time variable T exceeds a predetermined upper limit value (e.g., 5 sec). Then, if the value of the time variable T is equal to or lower than the predetermined upper limit value, the CPU 60a returns to the process in step S317.

During the execution of the processing loop of steps S317 and S318, if the value of the time variable T exceeds the predetermined upper limit value before the lateral acceleration of the automobile exceeds the predetermined upper limit value, the CPU 60a proceeds to a process in S319 from step S318.

In step S319, the CPU 60a changes over a stable lateral acceleration condition flag to "TRUE", and proceeds to a process in S321 in FIG. 4.

While on the other hand, during the execution of the processing loop of steps S317 and S318, if the upper limit value of the lateral acceleration of the automobile exceeds the predetermined value before the value of the time variable T exceeds the predetermined upper value, the CPU 60a proceeds to a process in S320 from step S317.

In step S320, the CPU 60a changes over the stable lateral acceleration condition flag to "FALSE", and proceeds to a process in step S321 in FIG. 4.

After finishing the execution of the three routines in FIGS. 5 through 7 (after acquiring a return value), in step S321, the CPU 60a judges whether or not "TRUE" is set in each of the three flags such as the stable speed condition flag, the stable longitudinal acceleration condition flag and the stable lateral acceleration condition flag. Then, the CPU 60a, if "FALSE" is set in even one of these three flags, returns to the process in step S301. If "TRUE" is set in all the three flags, the CPU 60a proceeds to a process in step S322.

In step S322, the CPU 60a changes over the vehicle state to the stable state from the non-stable state. More specifically, the CPU 60a updates the value of the vehicle state variable Vs to "3" from "2". Then, the CPU 60a finishes executing the non-stable state process, and proceeds to a process in step S105 in the main routine in FIG. 2.

Moreover, in step S101, if the value substituted into the vehicle state variable Vs is "3", the CPU 60a infers that the vehicle state is a stable state and proceeds to a process in step S104.

In step S104, the CPU 60a reads a stable state subroutine and starts executing a stable state process. FIGS. 8 through 11 are explanatory flowcharts of this stable state process.

In first step S401 after starting the execution of the stable state process, the CPU 60a monitors the speed data that are sequentially updated in the first I/O port 60e, and judges whether or not the speed of the automobile is 0 km/h. Then, if the speed of the automobile is 0 km/h, the CPU 60a proceeds to a process in step S402.

In step S402, the CPU 60a starts a time measuring process of incrementing the value of the time variable T by predetermined unit second from "0".

In next step S403, the CPU 60a judges whether or not the speed of the automobile is 0 km/h. Then, if the speed of the automobile is 0 km/h, the CPU 60a proceeds to a process in step S404.

In step S404, the CPU 60a judges whether or not the value of the time variable T exceeds a predetermined upper limit value (e.g., 3 sec). Then, if the value of the time variable T is equal to or lower than the predetermined upper limit value, the CPU 60a returns to the process in step S403.

During the execution of the processing loop of steps S403 and S404, the CPU 60a, if the speed of the automobile comes to a speed other than 0 km/h before the value of the time variable T exceeds the predetermined upper limit value, returns to the process in S401 from step S403. Then, if the value of the time variable T exceeds the predetermined upper limit value before the speed of the automobile comes to the speed other than 0 km/h, the CPU 60a proceeds to a process in S405 from step S404.

In step S405, the CPU 60a changes over the vehicle state to the stop state from the stable state. More specifically, the CPU 60a changes the value of the vehicle state variable Vs to "1" from "3". Then, the CPU 60a finishes executing the stable state process, and proceeds to a process in S105 in the main routine in FIG. 2.

While on the other hand, in step S401, if the speed of the automobile is not 0 km/h, the CPU 60a proceeds to processes in steps S406, S411 and S416. Note that a routine in steps S406–S410 shown in FIG. 9, a routine in steps S411–S415 shown in FIG. 10 and a routine in steps S416–S420 shown in FIG. 11 are executed in parallel with each other, and step S421 is executed when finishing all these three routines.

Figure 9:
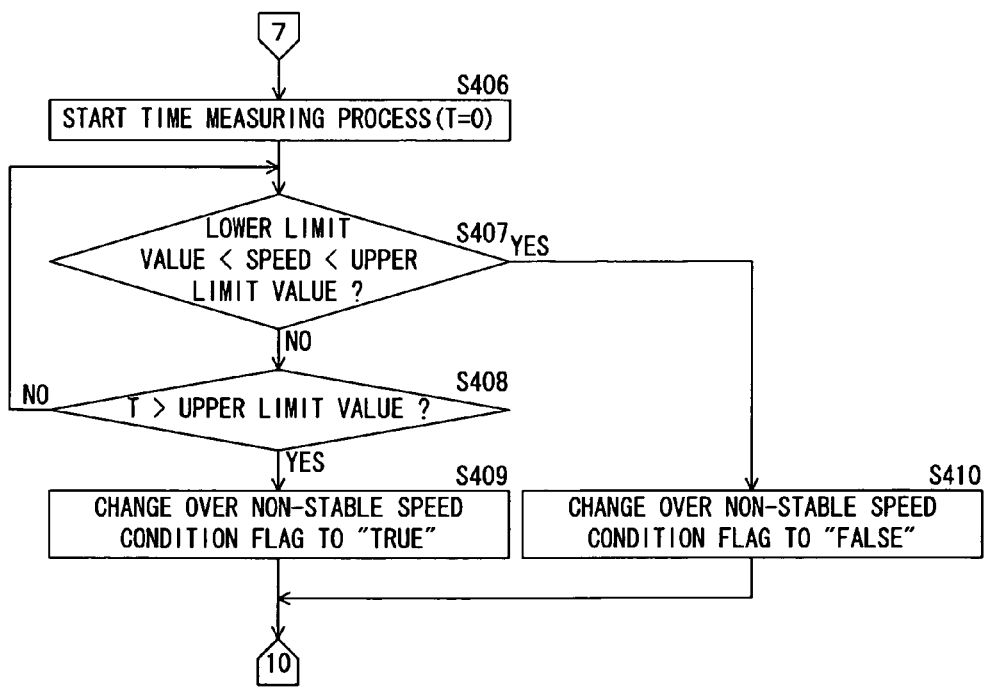
FIG. 9 is an explanatory flowchart of the stable state process executed as the subroutine in the vehicle state monitoring process.

In step S406 in FIG. 9, the CPU 60a starts a time measuring process of incrementing the value of the time variable T by the predetermined unit second from "0".

In next step S407, the CPU 60a judges whether or not the speed of the automobile is within a predetermined speed range. Namely, the CPU 60 judges whether or not the speed of the automobile is lower than the predetermined upper limit value but higher than a predetermined lower limit value. Note that deviation of the automobile speed from the predetermined range is the speed condition defined as one of the conditions for judging that the vehicle state of the automobile becomes a non-stable traveling state, and a value of, for example, 100 km/h is set as an upper limit value of this range, while a lower limit value of the range is set to 40 km/h. Note that the upper limit value may not, if unnecessary, be set. Then, if the speed of the automobile is not within the predetermined speed range, the CPU 60a proceeds to a process in step S408.

In step S408, the CPU 60a judges whether or not the value of the time variable T exceeds a predetermined upper limit value (e.g., 5 sec). Then, if the value of the time variable T is equal to or lower than the predetermined upper limit value, the CPU 60a returns to the process in step S407.

During the execution of the processing loop of steps S407 and S408, if the value of the time variable T exceeds the predetermined upper limit value before the speed of the automobile comes within the predetermined speed range, the CPU 60a proceeds to a process in S409 from step S408.

Figure 8:
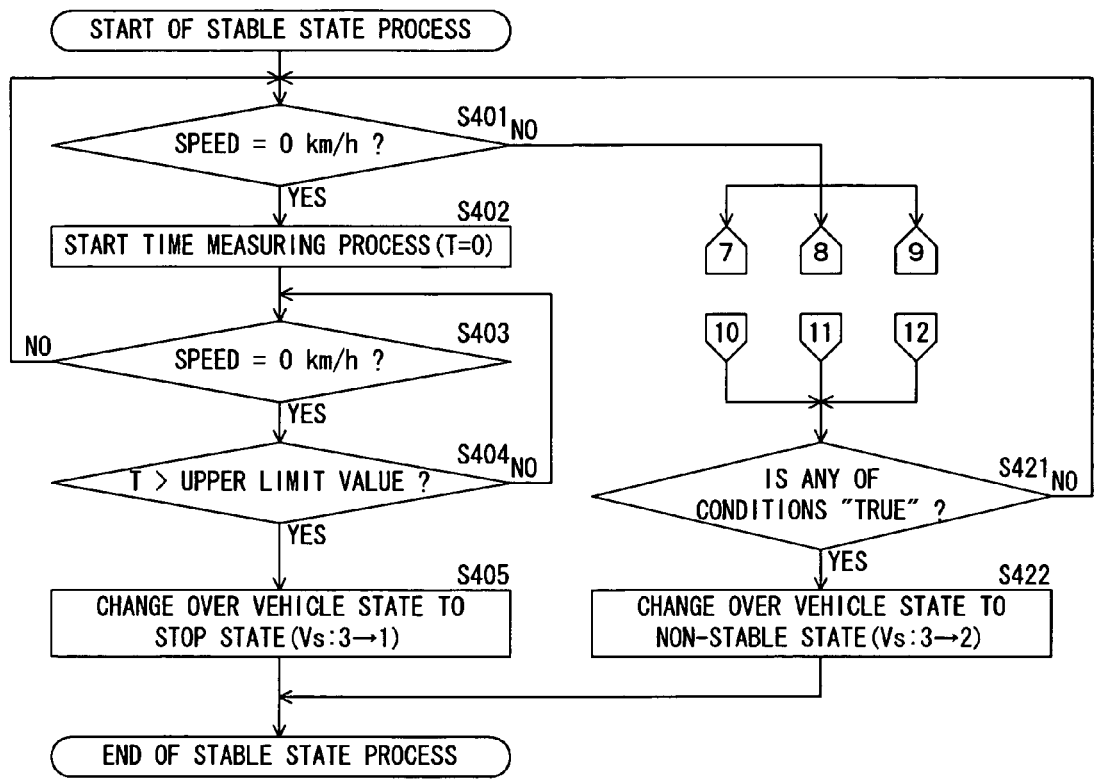
FIG. 8 is an explanatory flowchart of a stable state process executed as a subroutine in the vehicle state monitoring process.

In step S409, the CPU 60a changes over a non-stable speed condition flag to "TRUE" and proceeds to a process in step S421 in FIG. 8.

While on the other hand, during the execution of the processing loop of steps S407 and S408, if the speed of the automobile comes within the predetermined speed range before the value of the time variable T exceeds the predetermined upper limit value, the CPU 60a proceeds to a process in S410 from step S407.

In step S410, the CPU 60a changes over the non-stable speed condition flag to "FALSE" and proceeds to a process in step S421 in FIG. 8.

Figure 10:
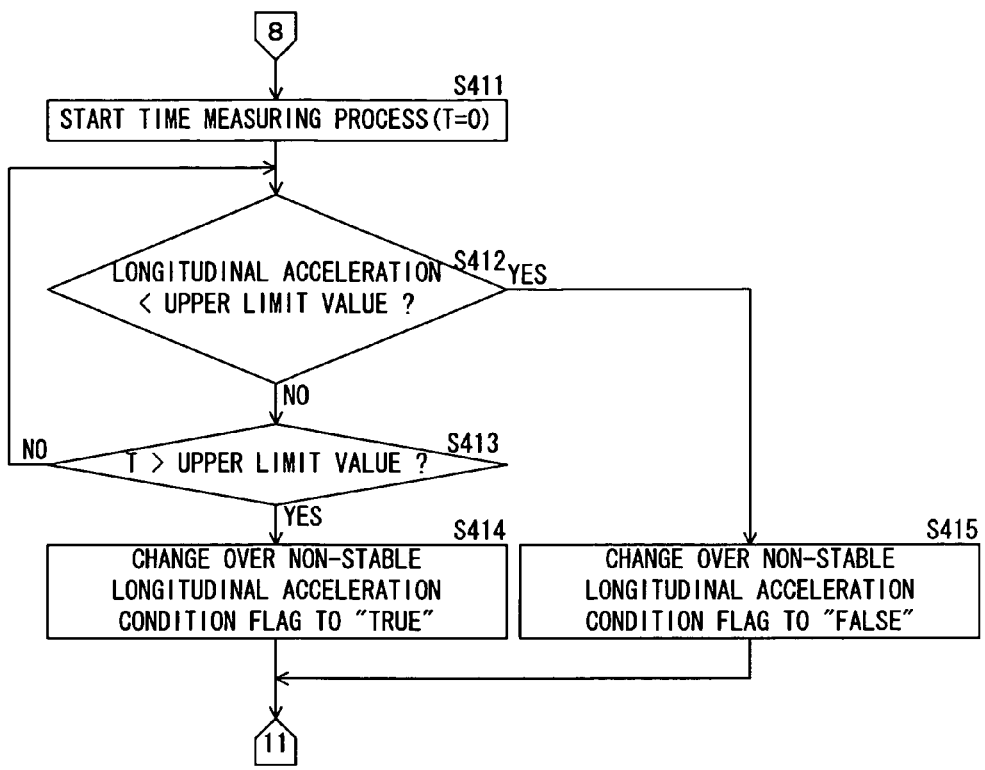
FIG. 10 is an explanatory flowchart of the stable state process executed as the subroutine in the vehicle state monitoring process.
Figure 11:
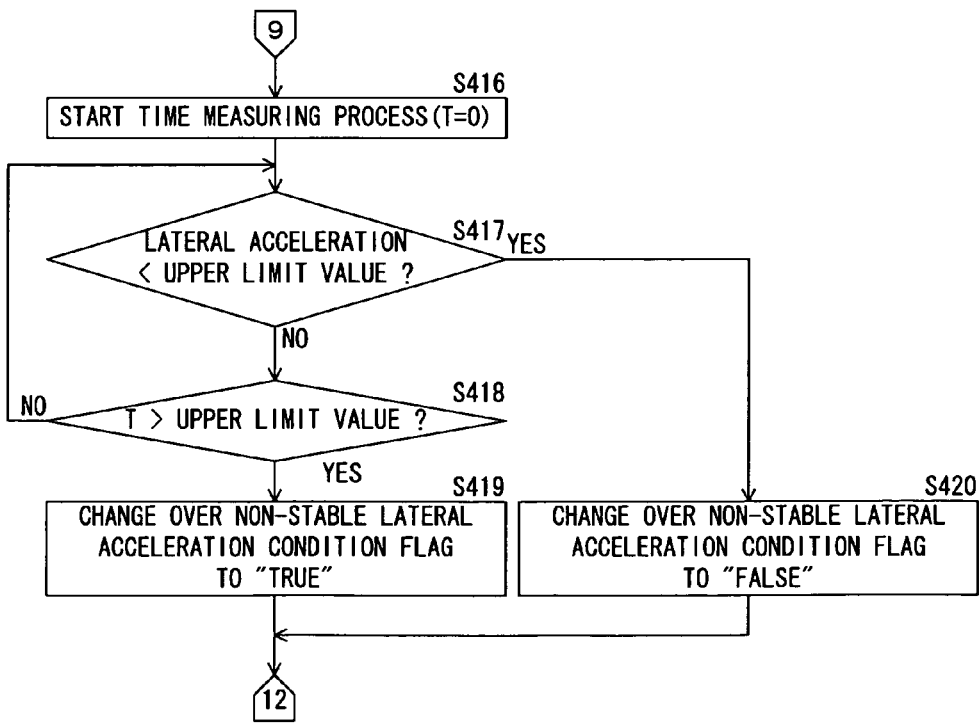
FIG. 11 is an explanatory flowchart of the stable state process executed as the subroutine in the vehicle state monitoring process.

Further, in step S411 in FIG. 10, the CPU 60a starts a time measuring process of incrementing the value of the time variable T by predetermined unit second from "0".

In next step S412, the CPU 60a monitors the longitudinal acceleration data that are sequentially updated in the second I/O port 60f, and judges whether or not the longitudinal acceleration of the automobile is lower than a predetermined upper limit value. Note that this upper limit value is the acceleration condition defined as one of the conditions for judging that the vehicle state of the automobile comes to the non-stable traveling state, and a value of, e.g., 2 m/s$^2$ is set as this upper limit value. Then, if the longitudinal acceleration of the automobile is equal to or higher than the predetermined upper limit value, the CPU 60a proceeds to a process in step S413.

In step S413, the CPU 60a judges whether or not the value of the time variable T exceeds the predetermined upper limit value (e.g., 5 sec). Then, if the value of the time variable T is equal to or lower than the predetermined upper limit value, the CPU 60a returns to the process in step S412.

During the execution of the processing loop of steps S412 and S413, if the value of the time variable T exceeds the predetermined upper limit value before the longitudinal acceleration of the automobile becomes lower than the predetermined upper limit value, the CPU 60a proceeds to a process in S414 from step S413.

In step S414, the CPU 60a changes over a non-stable longitudinal acceleration condition flag to "TRUE", and proceeds to a process in step S421 in FIG. 8.

While on the other hand, during the processing loop of steps S412 and S413, if the longitudinal acceleration of the automobile becomes lower than the predetermined upper limit value before the value of the time variable T exceeds the predetermined upper limit value, the CPU 60a proceeds to a process in S415 from step S412.

In step S415, the CPU 60a changes over the non-stable longitudinal acceleration condition flag to "FALSE" and proceeds to a process in step S421 in FIG. 8.

Further, in step S416 in FIG. 11, the CPU 60a starts a time measuring process of incrementing the value of the time variable T by predetermined unit second from "0".

In next step S417, the CPU 60a monitors the lateral acceleration data that are sequentially updated in the third I/O port 60g, and judges whether or not the lateral acceleration of the automobile is lower than a predetermined upper limit value. Note that this upper limit value is a curve condition defined as one of the conditions for judging that the vehicle state of the automobile becomes the non-stable traveling state, and a value of, e.g., 1 m/s² is set as this upper limit value. Then, if the lateral acceleration of the automobile is equal to or higher than the predetermined upper limit value, the CPU 60a proceeds to a process in step S418.

In step S418, the CPU 60a judges whether or not the value of the time variable T exceeds a predetermined upper limit value (e.g., 5 sec). Then, if the value of the time variable T is equal to or lower than the predetermined upper limit value, the CPU 60a returns to the process in step S417.

During the execution of the processing loop of steps S417 and S418, if the value of the time variable T exceeds the predetermined upper limit value before the lateral acceleration of the automobile becomes lower than the predetermined upper limit value, the CPU 60a proceeds to a process in S419 from step S418.

In step S419, the CPU 60a changes over a non-stable lateral acceleration condition flag to "TRUE" and proceeds to a process in step S421 in FIG. 8.

While on the other hand, during the execution of the processing loop of steps S417 and S418, if the lateral acceleration of the automobile becomes lower than the predetermined upper limit value before the value of the time variable T exceeds the predetermined upper limit value, the CPU 60a proceeds to a process in S420 from step S417.

In step S420, the CPU 60a changes over the non-stable lateral acceleration condition flag to "FALSE", and proceeds to a process in step S421 in FIG. 8.

After finishing the execution of the three routines in FIGS. 9 through 11 (after acquiring a return value), in step S421, the CPU 60a judges whether or not "TRUE" is set in at least one of the three flags such as the non-stable speed condition flag, the non-stable longitudinal acceleration condition flag and the non-stable lateral acceleration condition flag. Then, the CPU 60a, if "FALSE" is set in all the three flags, returns to the process in step S401 and, if "TRUE" is set in even one of the three flags, proceeds to a process in step S422.

In step S422, the CPU 60a changes over the vehicle state to the non-stable state from the stable state. To be more specific, the CPU 60a changes the value of the vehicle state variable Vs to "2" from "3". Then, the CPU 60a finishes executing the stable state process, and proceeds to a process in step S105 in the main routine in FIG. 2.

In step S105, the CPU 60a notifies the behavior monitoring process and the hazard state judging process of the value of the vehicle state variable Vs at that point of time. Thereafter, the CPU 60a returns to the process in step S101, and judges what value is substituted into the vehicle state variable Vs at that point of time.

Through the execution of the vehicle state monitoring process described above, the vehicle state is changed over to the stop state (S103, S301–S305, S104, S401–S405) when a fixed period of time elapses since the automobile has stopped, and is changed over to the non-stable state (S102, S201–S205) when a fixed period of time elapses since the automobile has started traveling.

Moreover, when the vehicle state is in the non-stable state, if there continue for a fixed period of time a state where the speed of the automobile is equal to or higher than a predetermined speed and a state where each of the longitudinal acceleration and the lateral acceleration is equal to or lower than a predetermined acceleration, the vehicle state is changed over to the stable state (S103, S301, S306–S322). Namely, when in a state where there is not effected such a sudden acceleration/deceleration as to tread on an accelerator pedal or a brake pedal with great force (the stable longitudinal acceleration condition flag=TRUE), when in a state of not turning along a curved road (curve) (the stable lateral acceleration condition flag=TRUE) and when in a state of traveling at the predetermined speed or over (the stable speed condition flag=TRUE), the vehicle state is changed over to the stable state.

Moreover, when the vehicle state is in the stable state, if there continue for the fixed period of time a state where the speed of the automobile is within the predetermined speed range and a state where each of the longitudinal acceleration and the lateral acceleration is equal to or higher than the predetermined acceleration, the vehicle state is changed over to the non-stable state (S104, S401, S406–S422). Namely, when in a state where there is effected such a sudden acceleration/deceleration as to tread on the accelerator pedal or the brake pedal with great force (the non-stable longitudinal acceleration condition flag=TRUE), when in a state of turning along the curved road (curve) (the non-stable lateral acceleration condition flag=TRUE) or when in a state of not traveling at the predetermined speed (the non-stable speed condition flag=TRUE), the vehicle state is changed over to the non-stable state.

Then, when the vehicle state is thus changed over, the behavior monitoring process and the hazard state judging process, which will hereinafter be explained, are notified of the vehicle state variable Vs (S105).

<Behavior Monitoring Process>

Figure 12:
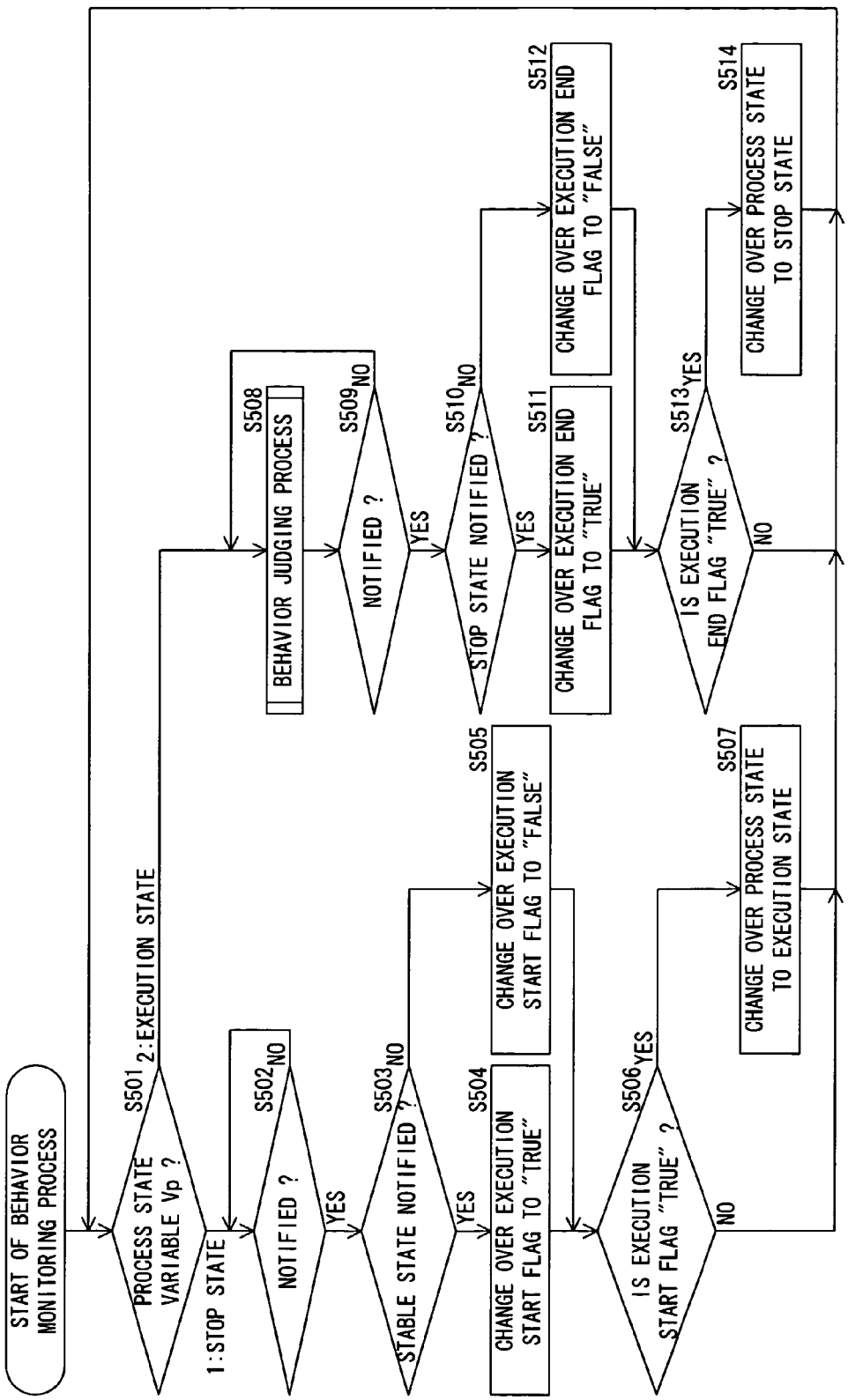
FIG. 12 is an explanatory flowchart of a behavior monitoring process executed in the on-vehicle unit of the alarm system.

FIG. 12 is an explanatory flowchart of the behavior monitoring process.

In first step S501 after starting the execution of the behavior monitoring process, the CPU 60a judges what value is substituted into a process state variable Vp. Note that the value of this process state variable Vp is set to "1" as an initial value when started. Then, if the value substituted into the process state variable Vp is "1", the CPU 60a infers that a process state is a stop state, and proceeds to a process in step S502.

In step S502, the CPU 60a stands by till the CPU 60a is notified of the value of the vehicle state variable Vs from the vehicle state monitoring process described above. Then, the CPU 60a, when notified of the value of the vehicle state variable Vs from the vehicle state monitoring process, proceeds to a process in step S503.

In step S503, the CPU 60a judges whether the value of the vehicle state variable Vs is "3" or not. Namely, the CPU 60a judges whether or not the vehicle state is changed over to the stable state. Then, if the notified value of the vehicle state variable Vs is "3", the CPU 60a proceeds to a process in step S504.

In step S504, the CPU 60a changes over an execution start flag to "TRUE" and proceeds to a process in step S506.

While on the other hand, in step S503, if the notified value of the vehicle state variable Vs is not "3", the CPU 60a proceeds to a process in S505.

In step S505, the CPU 60a changes over the execution start flag to "FALSE" and proceeds to a process in step S506.

In step S506, the CPU 60a judges whether the execution start flag is "TRUE" or not. Then, the CPU 60a, if the execution start flag is not "TRUE", returns to the processes in S501 and S502 and, if the execution start flag is "TRUE", proceeds to a process in step S507.

In step S507, the CPU 60*a* changes over the process state to an execution state from the stop state. To be more specific, the CPU 60*a* changes the value of the process state variable Vp to "2" from "1". Thereafter, the CPU 60*a* returns to the process in step S501.

On the other hand, in step S501, if the value substituted into the process state variable Vp is "2", the CPU 60*a* infers that the process state is the execution state, and proceeds to a process in step S508.

Figure 13:
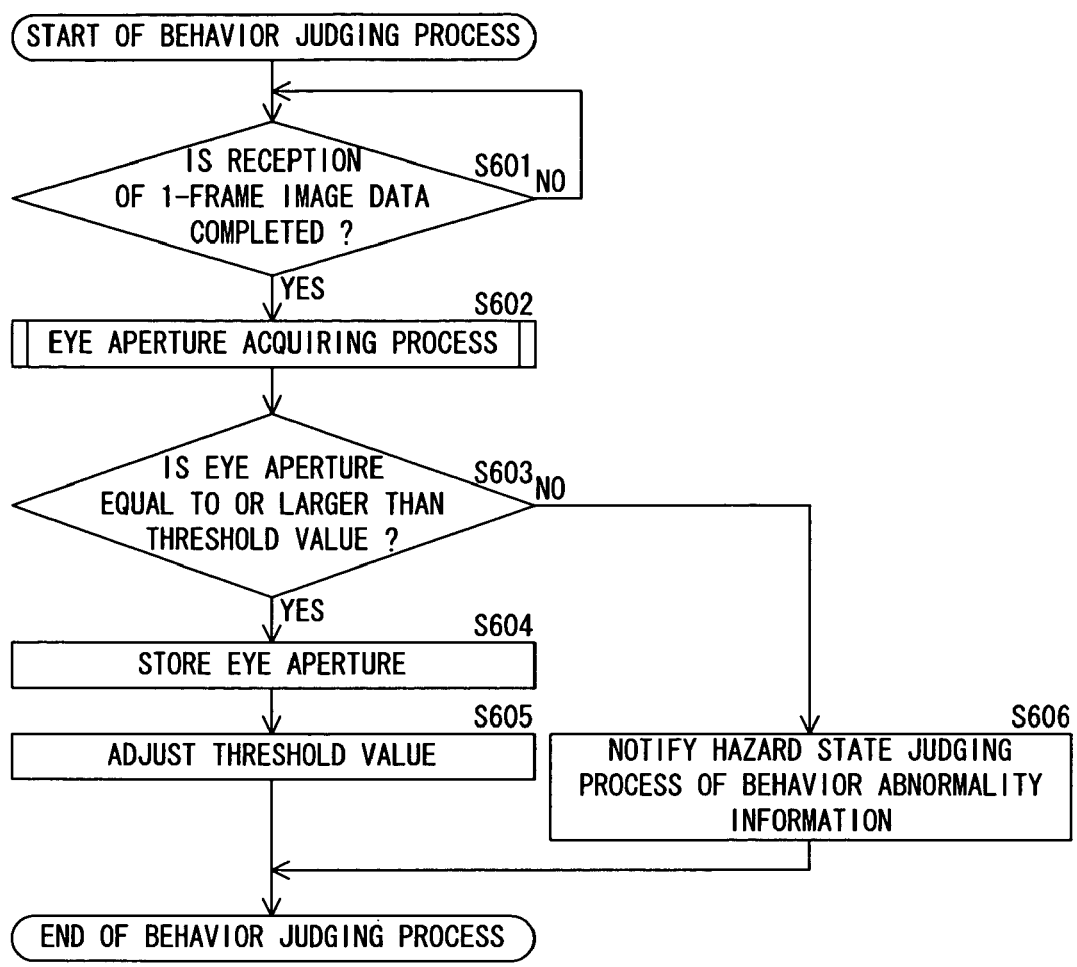
FIG. 13 is an explanatory flowchart of a closed-eye related behavior judging process executed as a subroutine in the behavior monitoring process.

In step S508, the CPU 60*a* reads a behavior judging subroutine, and starts executing a behavior judging process. FIG. 13 is an explanatory flowchart of this behavior judging process.

In first step S601 after starting the execution of the behavior judging process, the CPU 60*a* stands by till image data for one frame are completely received from the video control device 60*c*. Then, upon completing the reception of the image data for one frame, the CPU 60*a* proceeds to a process in step S602.

In step S602, the CPU 60*a* executes an eye aperture acquiring process. Note that this eye aperture acquiring process is an eye aperture acquiring process as described in depth in, for instance, Japanese Patent Application Laid-Open Publication No. 2000-163564, Japanese Patent Application Laid-Open Publication No. 2000-142164, Japanese Patent Application Laid-Open Publication No. 07-181012 and Japanese Patent Application Laid-Open Publication No. 06-032154, and hence its detailed explanation is omitted herein. To give an outline thereof, however, the eye aperture acquiring process is a process in which a pixel group representing an eye of the driver D is specified from within all the pixels in the image data received, and a vertical width of the specified pixel groups is measured as an aperture of the eye of the driver D. The CPU 60*a* acquires the aperture of the eye of the driver D by executing this sort of eye aperture acquiring process, and thereafter proceeds to a process in step S603.

In step S603, the CPU 60*a* judges whether or not the acquired eye aperture is equal to or larger than a predetermined threshold value. Then, the CPU 60*a*, if the eye aperture is equal to or larger than the predetermined threshold value, infers a high possibility that the driver D keeps awaking, and proceeds to a process in step S604.

In step S604, the CPU 60*a* stores the acquired eye aperture on the RAM 60*b* and proceeds to a process in step S605.

In step S605, the CPU 60*a* adjusts the threshold value described above. Note that a variety of methods are exemplified as a threshold value adjusting method, however, the adjusting method, which will hereinafter be explained, may be adopted by way of one example. This adjusting method is a such a method that the CPU 60*a* calculates an average value of a multiplicity of apertures (or a predetermined number of the latest apertures) stored on the RAM 60*b*, calculates a difference between this average value and an original threshold value, determines an adjustment quantity based on this difference, and generates a new threshold value by adding or subtracting this adjusting quantity to or from the original threshold value. The CPU 60*a*, after making the adjustment of the threshold value according to the adjusting method given by way of one example described above, finishes executing the behavior judging process, and proceeds to a process in step S509 in a main routine in FIG. 12.

While on the other hand, in step S603, if the eye aperture is less than the predetermined threshold value, the CPU 60*a* infers a high possibility that that the driver D keeps sleeping, and proceeds to a process in step S606.

In step S606, the CPU 60*a* notifies the hazard state judging process of a behavior abnormal information indicating that behavior of the driver D is abnormal. Thereafter, the CPU 60*a* finishes executing the behavior judging process and proceeds to a process in step S509 in the main routing in FIG. 12.

In step S509, the CPU 60*a* judges whether or not the vehicle state monitoring process notifies of a value of the vehicle state variable Vs. Then, if the vehicle state monitoring process does not notify of any value of the vehicle state variable Vs, the CPU 60*a* returns to the process in step S508.

During the execution of the processing loop of step S508 and S509, if the vehicle state monitoring process notifies of the value of the vehicle state variable Vs, the CPU 60*a* proceeds to a process in step S510.

In step S510, the CPU 60*a* judges whether the notified value of the vehicle state variable Vs is "1" or not. Namely, the CPU 60*a* judges whether or not the vehicle state is changed over to the stop state. Then, the notified value of the vehicle state variable Vs is "1", the CPU 60*a* proceeds to a process in step S511.

In step S511, the CPU 60*a* changes over an execution end flag to "TRUE" and proceeds to a process in step S513.

While on the other hand, in step S510, if the notified value of the vehicle state variable Vs is not "1", the CPU 60*a* proceeds to a process in step S512.

In step S512, the CPU 60*a* changes over the execution end flag to "FALSE" and proceeds to a process in step S513.

In step S513, the CPU 60*a* judges whether or not the execution end flag is "TRUE". Then, the CPU 60*a*, if the execution end flag is not "TRUE", returns to the processes in steps S501, S508 and S509 and, whereas if the execution end flag is "TRUE", proceeds to a process in step S514.

In step S514, the CPU 60*a* changes over the process state to the stop state from the execution state. More specifically, the CPU 60*a* changes the value of the process state variable Vp to "1" from "2". Thereafter, the CPU 60*a* returns to the processes in steps S501 and S502.

The behavior monitoring process is thus executed, whereby the vehicle state changes over to the stable state from the stop state (S501–S507). Then, there starts a process of judging whether to notify of the behavior abnormality information per frame of the image data (S508, S509). Namely, there is made a start of monitoring the behavior of the driver who is in the middle of driving the automobile. During a period of monitoring the behavior of the driver D, if the vehicle state changes to the stop state from the stable state or the non-stable state (S510–S513), the process of monitoring the behavior of the driver D is finished (S514).

Further, as a result of monitoring the behavior, the hazard state judging process that will be explained later on is notified of the behavior abnormality information (S606). Note that the notification of this behavior abnormality information is given for one-frame image data (S508, S601–S606), and hence, in the case of judging that the notification of the behavior abnormality information should be made for all the consecutive 10-frame image data, the hazard state judging process is notified of the behavior abnormality information ten times consecutively.

<Hazard State Judging Process>

Figure 14:
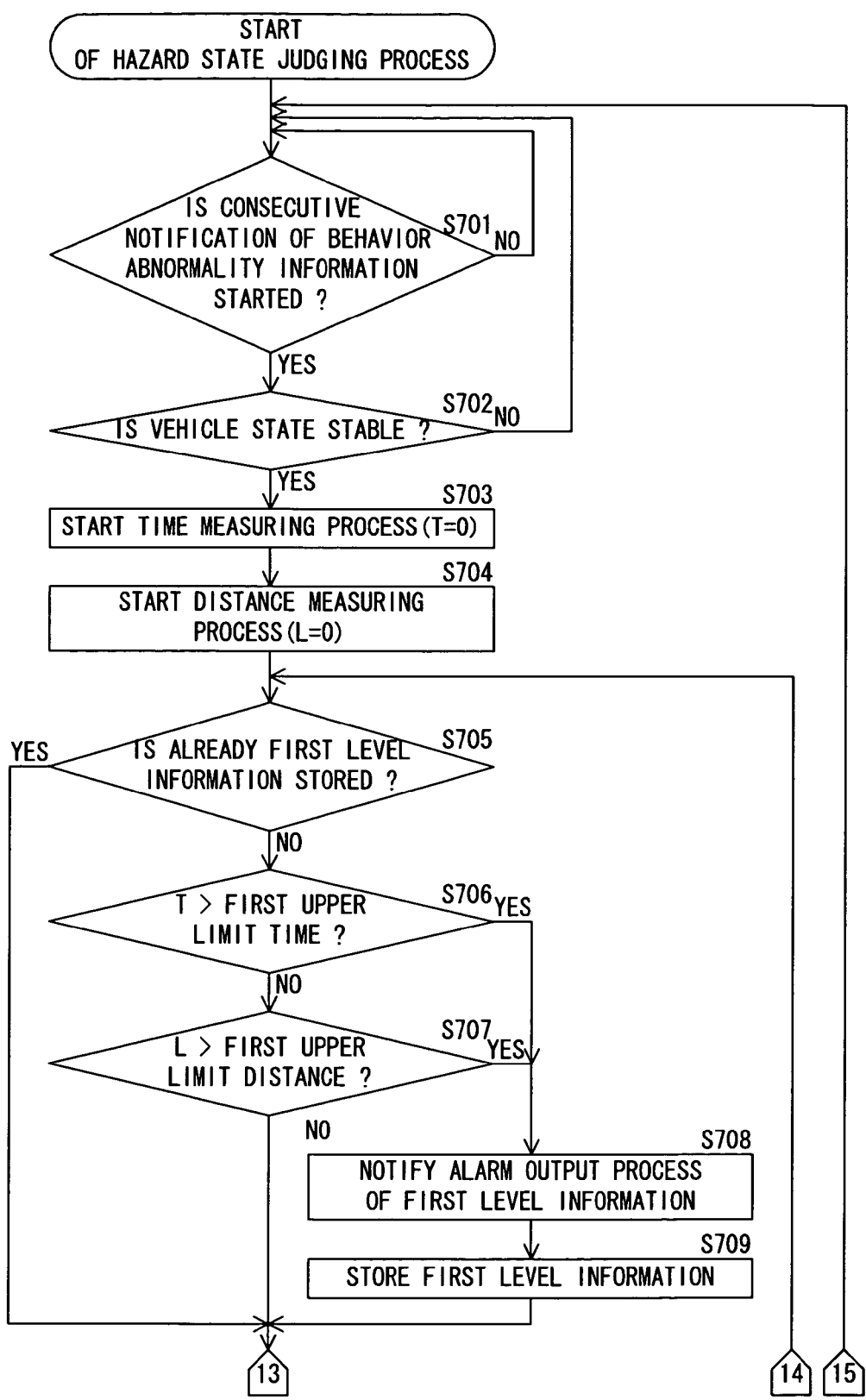
FIG. 14 is an explanatory flowchart of a hazard state judging process executed in the on-vehicle unit of the alarm system.
Figure 15:
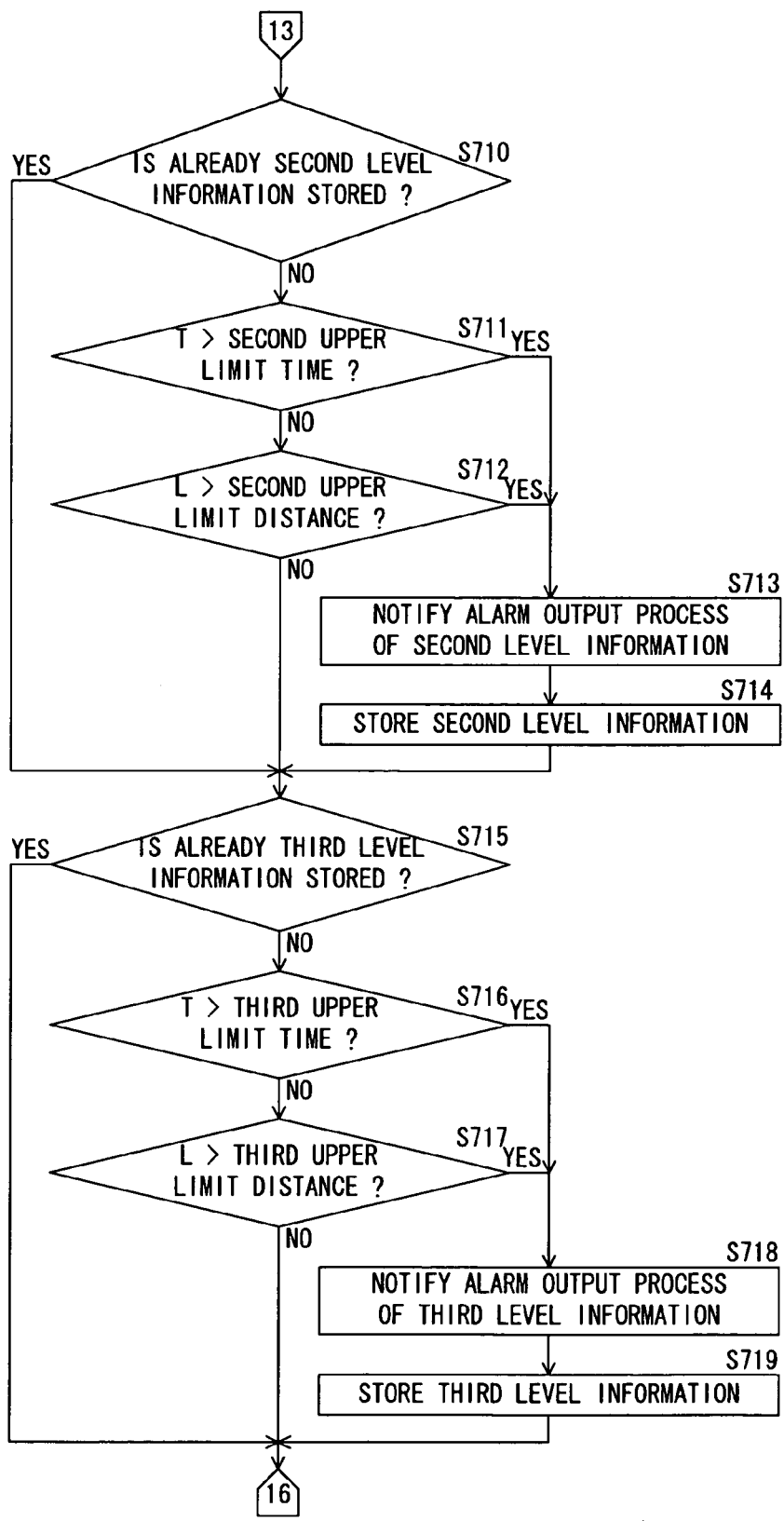
FIG. 15 is an explanatory flowchart of the hazard state judging process executed in the on-vehicle unit of the alarm system.
Figure 16:
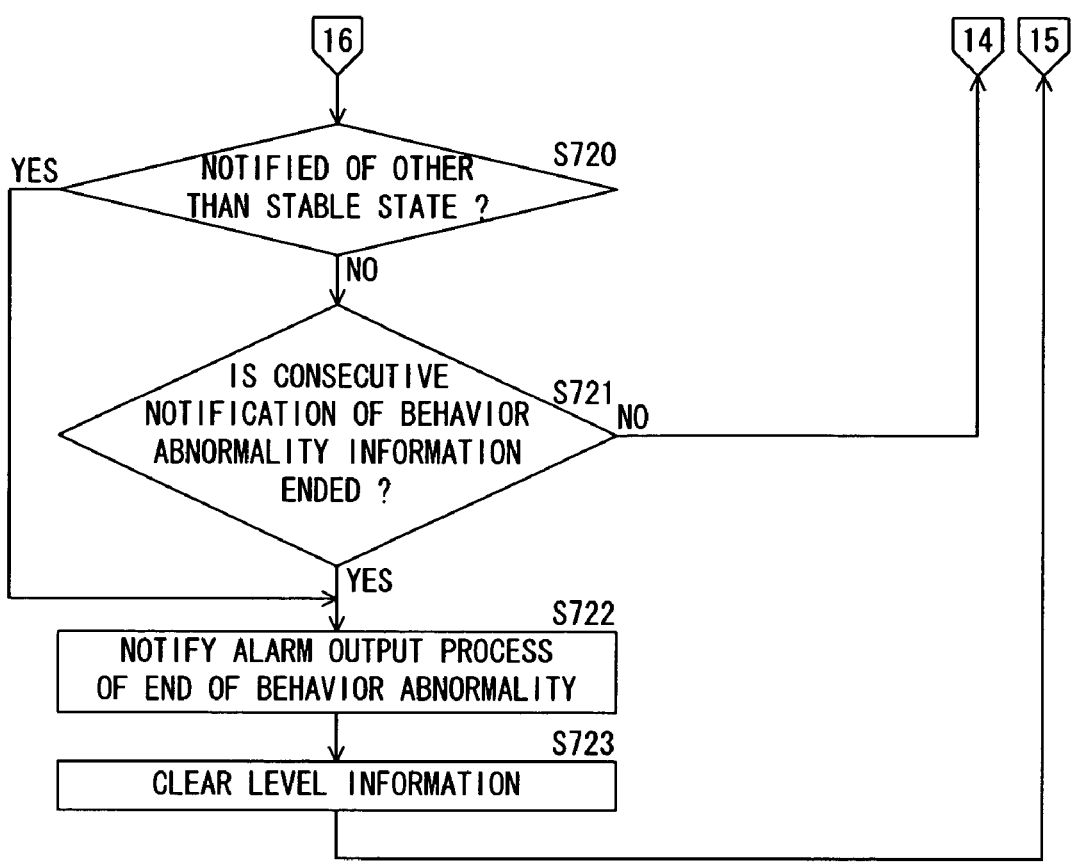
FIG. 16 is an explanatory flowchart of the hazard state judging process executed in the on-vehicle unit of the alarm system.

FIGS. 14 through 16 are explanatory flowcharts of the hazard state judging process.

In first step S701 after starting the execution of the hazard state judging process, the CPU 60*a* stands by till the behavior monitoring process starts notifying of the behavior abnormality information consecutively. Then, the CPU 60*a*, when the behavior monitoring process starts notifying of the behavior abnormality information consecutively, proceeds to a process in step S702.

In step S702, the CPU 60a judges whether the vehicle state is the stable state or not. Then, the CPU 60a, if the vehicle state is not the stable state, returns to the process in step S701 and, whereas if the vehicle state is the stable state, proceeds to a process in step S703.

In step S703, the CPU 60a starts a time measuring process of incrementing the value of the time variable T by predetermined unit second from "0".

In next step S704, the CPU 60a starts a distance measuring process. Note that this distance measuring process involves repeating a process of sampling the speed data from the first I/O port 60e at a fixed time interval (e.g., every 0.5 sec) and calculating a traveling distance of the automobile at this time interval on the basis of the sampled speed data and its time. Furthermore, the traveling distance per time interval is integrated, and a traveling distance variable L is sequentially updated with this integrated value. The CPU 60a, after starting this distance measuring process, proceeds to a process in step S705.

In step S705, the CPU 60a judges whether or not the RAM 60b is stored with first level information that will be explained later on. Then, the CPU 60a, when the first level information is stored on the RAM 60b, proceeds to a process in step S710 and, when the first level information is not stored on the RAM 60b, proceeds to a process in step S706.

In step S706, the CPU 60a judges whether or not the value of the time variable T exceeds a predetermined first upper limit time (e.g., 1 sec). Then, the CPU 60a, if the value of the time variable T exceeds the predetermined first upper limit time, proceeds to a process in step S708 and, if the value of the time variable T is equal to or lower than the predetermined first upper limit time, proceeds to a process in step S707.

In step S707, the CPU 60a judges whether or not the traveling distance variable L exceeds a predetermined first upper limit distance (e.g., 10 m). Then, the CPU 60a, if the value of the traveling distance variable L is equal to or smaller than the predetermined first upper limit distance, proceeds to a process in step S710 and, if the value of the traveling distance variable L is larger than the predetermined first upper limit distance, proceeds to a process in step S708.

In step S708, the CPU 60a notifies the alarm output process of the first level information. Note that this first level information is information representing continuation of the behavior abnormality of the driver D during an elapse of only the predetermined period of time (the first upper limit time) or during a period for which the automobile travels a predetermined distance (the first upper limit distance).

In next step S709, the CPU 60a stores the first level information on the RAM 60b and proceeds to a process in step S710.

In step S710, the CPU 60a judges whether or not the RAM 60b is stored with second level information that will be described later on. Then, the CPU 60a, if the RAM 60b is stored with the second level information, proceeds to a process in step S715 and, whereas if the second level information is not stored on the RAM 60b, proceeds to a process in step S711.

In step S711, the CPU 60a judges whether or not the value of the time variable T exceeds a predetermined second upper limit time (e.g., 2 sec). Then, the CPU 60a, if the value of the time variable T exceeds the predetermined second upper limit time, proceeds to a process in step S713 and, whereas if the value of the time variable T is equal to or smaller than the predetermined second upper limit time, proceeds to a process in step S712.

In step S712, the CPU 60a judges whether or not the traveling distance variable L exceeds a predetermined second upper limit distance (e.g., 20 m). Then, the CPU 60a, the value of the traveling distance variable L is equal to or smaller than the predetermined second upper limit distance, proceeds to a process in step S715 and, if the value of the traveling distance variable L is greater than the predetermined second upper limit distance, proceeds to a process in step S713.

In step S713, the CPU 60a notifies the alarm output process of the second level information. Note that this second level information is information representing continuation of the behavior abnormality of the driver D during an elapse of only the predetermined period of time (the second upper limit time) or during a period for which the automobile travels a predetermined distance (the second upper limit distance).

In next step S714, the CPU 60a stores the second level information on the RAM 60b and proceeds to a process in step S715.

In step S715, the CPU 60a judges whether or not the RAM 60b is stored with third level information that will be described later on. Then, the CPU 60a, if the RAM 60b is stored with the third level information, proceeds to a process in step S720 and, whereas if the third level information is not stored on the RAM 60b, proceeds to a process in step S716.

In step S716, the CPU 60a judges whether or not the value of the time variable T exceeds a predetermined third upper limit time (e.g., 3 sec). Then, the CPU 60a, if the value of the time variable T exceeds the predetermined third upper limit time, proceeds to a process in step S718 and, whereas if the value of the time variable T is equal to or smaller than the predetermined third upper limit time, proceeds to a process in step S717.

In step S717, the CPU 60a judges whether or not the traveling distance variable L exceeds a predetermined third upper limit distance (e.g., 30 m). Then, the CPU 60a, the value of the traveling distance variable L is equal to or smaller than the predetermined third upper limit distance, proceeds to a process in step S720 and, if the value of the traveling distance variable L is greater than the predetermined third upper limit distance, proceeds to a process in step S718.

In step S718, the CPU 60a notifies the alarm output process of the third level information. Note that this third level information is information representing continuation of the behavior abnormality of the driver D during an elapse of only the predetermined period of time (the third upper limit time) or during a period for which the automobile travels a predetermined distance (the third upper limit distance).

In next step S719, the CPU 60a stores the third level information on the RAM 60b and proceeds to a process in step S720.

In step S720, the CPU 60a judges whether or not the vehicle state monitoring process notifies of the value, "1" or "2", of the vehicle state variable Vs. Then, the CPU 60a, if the vehicle state monitoring process notifies of the value, "1" or "2", of the vehicle state variable Vs, proceeds to a process in step S722 and, whereas if the vehicle state monitoring process notifies of none of the values, "1" and "2", of the vehicle state variable Vs, proceeds to a process in step S721.

In step S721, the CPU 60a judges whether or not the aforementioned behavior monitoring process finishes consecutively notifying of the behavior abnormality information. Then, the CPU 60*a*, if the aforementioned behavior monitoring process does not finish consecutively notifying of the behavior abnormality information, returns to the process in step S705 and, whereas if the aforementioned behavior monitoring process finishes consecutively notifying of the behavior abnormality information, proceeds to a process in step S722.

In step S722, the CPU 60*a* notifies the alarm output process, which will be explained later on, that the behavior abnormality is ended, and proceeds to a process in step S723.

In step S723, the CPU 60*a* clears the level information in the RAM 60*b* and returns to the process in step S701.

With this sort of the hazard state judging process thus executed, in such a case that the vehicle state is the stable state, when the behavior monitoring process begins to consecutively notify of the behavior abnormality information (S701, S702), there starts the process (S703–S719) of judging what level the hazard state is at. Then, this process continues during the period for which the vehicle state is kept in the stable state (S720) or during the period for which the notification of the behavior abnormality information is kept consecutive (S721), and, if the notification of the behavior abnormality information is interrupted, comes to an end (S723).

Further, this process (S703–S719) involves determining that the hazard state occurs if the elapse time or the automobile traveling distance, when consecutively notifying of the behavior abnormality information, exceed the allowable ranges (the first through third upper limit times and the first through third upper limit distances), and raising the level of the hazard state each time the elapse time and the traveling distance increase. Then, each time the level of the hazard state rises, the alarm output process, which will be explained in the following discussion, is notified of the information (the first through third level information) corresponding to the hazard level (S708, S713, S718).

Moreover, each time the consecutive notifications of the behavior abnormality information are interrupted, i.e., each time the driver D finishes the abnormal behavior, the hazard state judging process notifies the alarm output process of the end of the behavior abnormality (S722).

<Alarm Output Process>

Figure 17:
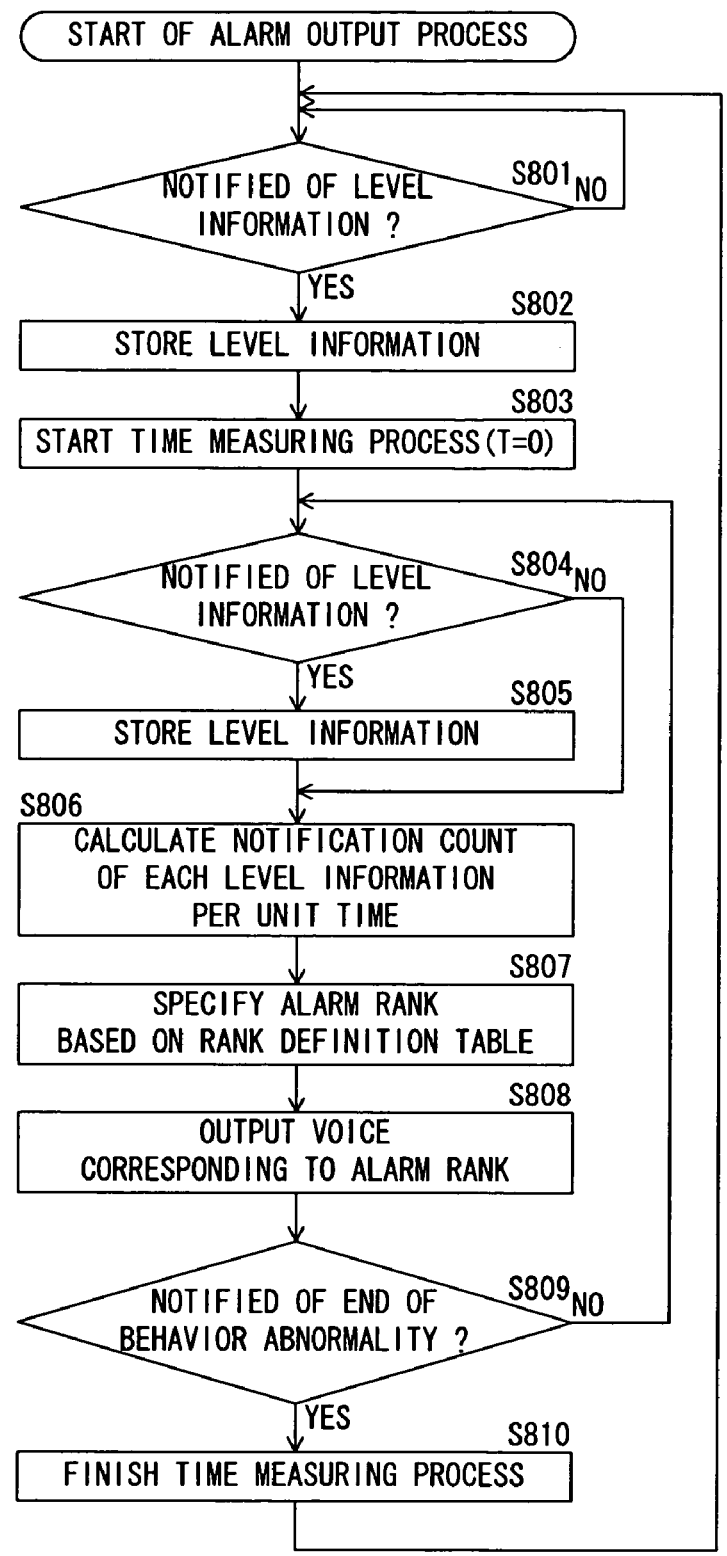
FIG. 17 is an explanatory flowchart of an alarm output process executed in the on-vehicle unit of the alarm system.

FIG. 17 is an explanatory flowchart of the alarm output process.

In first step S801 after starting the execution of the alarm output process, the CPU 60*a* stands by till the aforementioned hazard state judging process notifies of any one of the first level information through the third level information. Then, when notified of any one of the first level information through the third level information, the CPU 60*a* proceeds to a process in step S802.

In step S802, the CPU 60*a* stores the notified level information on the RAM 60*b* and proceeds to a process in step S803.

In step S803, the CPU 60*a* starts a time measuring process of incrementing the value of the time variable T by predetermined unit second from "0".

In next step S804, the CPU 60*a* judges whether or not the hazard state judging process notifies of any one of the first level information through the third level information. Then, the CPU 60*a*, if the hazard state judging process notifies of none of the first level information through the third level information, proceeds to a process in step S806 and, whereas if the hazard state judging process notifies of any one of the first level information through the third level information, proceeds to a process in step S805.

In step S805, the CPU 60*a* stores the notified level information on the RAM 60*b* and proceeds to a process in step S806.

In step S806, the CPU 60*a* calculates a notification count per unit time with respect to each of the first level information through the third level information on the basis of the respective level information stored on the RAM 60*b* and the value of the time variable T.

In next step S807, the CPU 60*a* refers to a rank definition table and thus specifies an alarm rank corresponding to a combination of the notification counts per unit time with respect to each of the first level information through the third level information.

Figures 18, 19:
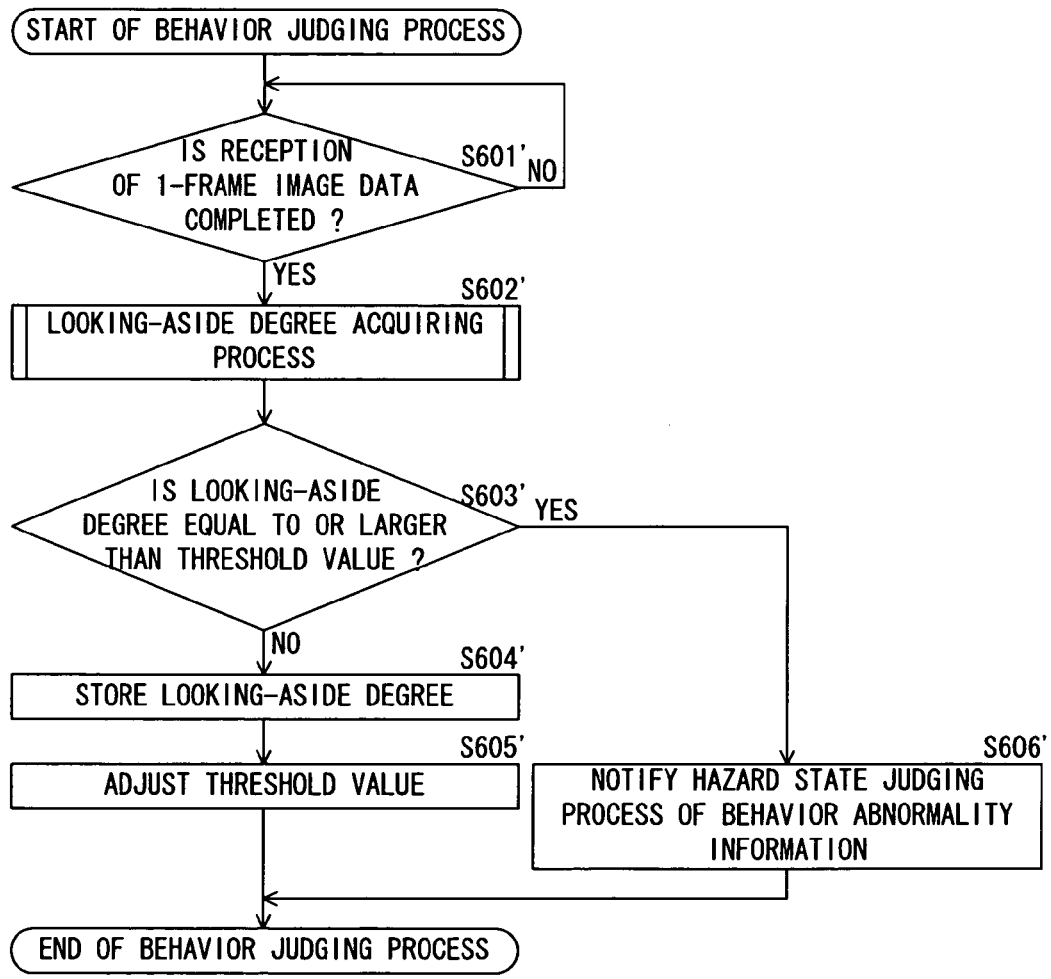
FIG. 18 is an explanatory diagram of a data structure of a rank definition table used in the alarm output process.
FIG. 19 is an explanatory flowchart of a looking-aside related behavior judging process executed as a subroutine in the behavior monitoring process.

FIG. 18 is a table created for explaining this rank definition table. As shown in FIG. 18, the rank definition table is structured by creating a record for every alarm rank, which consists of (pieces of data entered in) respective fields such as an [alarm rank] field, a [first level count] field, a [second level count] field and a [third level count] filed.

A number for identifying the alarm rank representing a degree of an alarm output that will be described alter on, is entered in the [alarm rank]. A notification count, per unit time, of the first level information is entered in the [first level count]. Similarly, notification counts per unit time of the second level information and the third level information are entered in the [second level count] and in the [third level count], respectively.

Note that when the CPU 60*a* refers to the rank definition table shown in FIG. 18, if the notification count per unit time of the first level information is "3", if the notification count of the second level information is "2, and if the notification count of the third level information is "1", the alarm rank is specified to be "3". Namely, the numerical values in the respective fields other than the [alarm rank] field of (one record specified by) one row of alarm rank take a logical sum (OR) relationship. Further, for example, if every notification count per unit time of the first level information through the third level information is "3", the highest alarm rank among those ranks is specified to be "5".

Then, the CPU 60*a*, after specifying the alarm rank by referring to the rank definition table, proceeds to a process in step S808 in FIG. 17.

In step S808, the CPU 60*a* transfers the voice data for outputting a voice corresponding to the alarm rank as an alarm to the sound source control device 60*d*, and instructs the source control device 60*d* to output signals based on the voice data to the loudspeaker 20.

Note that the ROM 60*h* is previously stored with corresponding pieces of voice data to the number of the alarm ranks, and a scheme is that the voice data associated with the higher alarm ranks are outputted as electronic sounds exhibiting higher tones. Then, the CPU 60*a*, in this step S808, specifies one piece of voice data associated with the alarm rank among multiple pieces of voice data in the ROM 60*h*, and transfers the specified voice data to the sound source control device 60*d*. Then, the CPU 60*a* instructs the sound source control device 60*d* to output the electronic sound exhibiting a tone pitch corresponding to the alarm rank as the alarm from the loudspeaker 20.

In next step S809, the CPU 60*a* judges whether or not the aforementioned hazard state judging process notifies of the end of the behavior abnormality. Then, the CPU 60*a*, if the aforementioned hazard state judging process does not notify of the end of the behavior abnormality, returns to the process in step S804 and, whereas if the aforementioned hazard state judging process notifies of the end of the behavior abnormality, proceeds to a process in step S810.

In step S810, the CPU 60a finishes the time measuring process and returns to the process in step S801.

With this sort of the alarm output process thus executed, till a notification of a next end of the behavior abnormality is given since the hazard state judging process has notified of the end of the behavior abnormality (i.e., during the period for which the driver D keeps taking the abnormal behavior), it is judged whether the alarm should be outputted, and, if judged to be outputted, it is also judged which level of the alarm is emitted, thereby outputting the alarm (S801–S810).

Further, the alarm rank is determined based on the notification count of the level information per unit time (S806, S807), and hence, if frequently notified of the level information or notified of the high level information, it follows that the electronic sound with the high-pitch tone is outputted as an alarm; or alternatively if the number of notifying of the level information decreases or if notified at a longer interval, it follows that the electronic sound with a low-pitch tone is outputted as an alarm (S804–S809).

Thus, according to the first embodiment, the traveling distance of the automobile during the continuation of the abnormal behavior state is adopted as the condition for judging whether there is the hazard state or not. Therefore, as the threshold value of the traveling distance (e.g., the first upper limit distance) is fixed, it follows that the limit time making the continuation of the abnormal behavior allowable linearly changes corresponding to the speed of the automobile. Hence, as the speed of the automobile becomes higher, the hazard state is judged simply by taking the abnormal behavior for a shorter period of time. When the speed of the automobile is low, the hazard state is not judged unless the abnormal behavior is taken for a comparatively long period of time. Accordingly, the driver of the automobile can exactly receive the alarm when the danger actually rises.

Moreover, according to the first embodiment, the conditions for judging the hazard state have the addition of the elapse time of the continuation of the abnormal behavior as the hazard stage judging condition, and hence, when the speed of the automobile becomes equal to or lower than the fixed speed, i.e., when the elapse time exceeds the threshold value (e.g., the first upper limit time), the time till the hazard state is judged is uniformly determined.

Further, according to the first embodiment, in the state where the traveling state of the automobile is kept stable, if the elapse time or the traveling distance during the continuation of the abnormal behavior taken by the driver D exceeds the predetermined value, the loudspeaker 20 outputs the alarm corresponding to a degree of the excess of the predetermined value. At this time, if the elapse time or the traveling distance during the continuation of the abnormal behavior is finely set stepwise corresponding to the level of the danger (the first through third upper limit time, and the first through third upper limit distances), the conditions for judging that the alarm should be outputted can be finely changed corresponding to the level of the danger.

Moreover, according to the first embodiment, the hazard state is not judged unless the automobile traveling state judged based on the speed, the longitudinal acceleration and lateral acceleration of the automobile is kept in the stable state, and hence unnecessary alarm is not outputted when the automobile stops and travels in the non-stable state.

MODIFIED EXAMPLE 1

By the way, according to the first embodiment discussed above, the electronic sound outputted as the alarm from the loudspeaker 20 is set to emit the higher pitch tone as the alarm rank gets higher, however, this setting may not be adopted. For example, the electronic sound outputted as the alarm from the loudspeaker 20 may also be ON/OFF-outputted. In this case, it is possible to inform the driver D of the hazard level that the driver D is taking the abnormal behavior by setting the ON/OFF interval shorter as the alarm rank becomes higher.

Moreover, the electronic sound outputted as the alarm from the loudspeaker 20 may also be set so that the pitch tone becomes higher and the ON/OFF interval gets shorter as the alarm rank gets higher. Further, the electronic sound may also be music. In the case of the music, if set so as to change to a melody of faster tempo corresponding to the higher level of the alarm rank, the driver D can be informed of the hazard level that the driver D is taking the abnormal behavior.

MODIFIED EXAMPLE 2

Moreover, in the first embodiment, the device for outputting the alarm is the loudspeaker 20 but may not be the loudspeaker 20. For instance, the alarm outputting device may be a monitor (unillustrated) connected to the video control device 60d, and may also be a light emitting diode lamp (unillustrated) connected to an unillustrated I/O port on the bus B.

In the case of the monitor as the former device, the CPU 60a transfers, to the video control device 60c, screen data for displaying an index corresponding to the alarm rank on the monitor, and instructs the video control device 60c to display a screen based on this screen data on the monitor. Note that this monitor may be mounted as dedicated to the alarm system on the automobile and may also be a monitor provided for a navigation system or a touch screen in the automobile.

Further, in the case of making the monitor output the alarm, available schemes may be such that a size of the index displayed on the monitor becomes large corresponding to the level of the alarm rank, that a color of the index displayed on the monitor changes corresponding to the level of the alarm rank, and that a flickering interval of the index displayed on the monitor gets short corresponding to the level of the alarm rank.

On the other hand, in the case of making the light emitting diode lamp output the alarm as by the latter device, available schemes may such that the flickering interval becomes short corresponding to the level of the alarm rank, and that an intensity of the emitted light becomes strong corresponding to the level of the alarm rank.

MODIFIED EXAMPLE 3

Further, in the first embodiment discussed above, the behavior judging process executed in step S508 of the behavior monitoring process shown in FIG. 12 is the process for judging the eye aperture of the driver D, and it is therefore judged whether or not the driver D is driving while dozing off, however, this type of judgment may not (necessarily) be made. For instance, this behavior judging process may also be a process of judging how much the driver D takes the driver's eyes off the road (a deviation of an axis of sight). FIG. 19 is an explanatory flowchart of the behavior judging process with respect to a looking-aside degree.

After starting the execution of the behavior judging process, the CPU 60a, when completely receiving the image data for one frame (S601'; YES), executes a looking-aside degree acquiring process (S602'). There exist a variety of looking-aside degree acquiring processes. An in-depth explanation of one example is given in Japanese Patent Application Laid-Open Publication No. 11-1617987 and 03-167698, and hence the detailed description thereof is not made herein. To explain its outline, however, this looking-aside degree acquiring process is a process of getting a direction of the face of the driver D from within all the pixels of the received image data, and acquiring a quantity of deviation from a proper direction of the face as a looking-aside degree.

Then, the CPU 60a, if the looking-aside degree is less than a predetermined threshold value (S603'; NO), stores the RAM 60b with this looking-aside degree (S604'), and, after adjusting the threshold value (S605'), proceeds to a process in step S509 in FIG. 12. Whereas if the looking-aside degree is equal to or larger than the predetermined threshold value (S603'; YES), the CPU 60a notifies the hazard state judging process of the behavior abnormality information about the looking-aside (S606'), and proceeds to a process in step S509 in FIG. 12.

When this type of the behavior judging process is executed in step S508 of the behavior monitoring process shown in FIG. 12, it is judged for every frame of the image data whether the driver D keeps the eyes on a scene or operates an audio device or drives while looking aside. As a result, if the driver D takes the eyes off the road while driving, the hazard state judging process notifies the alarm output process of any one of the first level information through the third level information, and a voice corresponding to the alarm rank is outputted as an alarm from the loudspeaker 20.

<Second Embodiment>

A second embodiment has substantially the same configuration as that of the first embodiment except such a point that there are prepared a multiplicity of combinations of the first through third upper limit time and the first through third upper limit distances used for the hazard state judging process to judge the hazard state, and a content of the hazard state judging process is slightly changed corresponding thereto. Accordingly, the following discussion will deal with the different point from the first embodiment.

In the first embodiment, in step S508 in the flowchart shown in FIG. 12, the behavior judging process about closed eye (eye aperture) as shown in FIG. 13 is executed. By contrast, according to the second embodiment, though not illustrated, in step S508 in FIG. 12, the behavior judging process about the looking-aside as shown in FIG. 19 is executed in parallel with the behavior judging process about the closed eye (eye aperture). As a result, the hazard state judging process is notified of the behavior abnormality information about the closed eye and of the behavior abnormality information about the looking-aside.

Figure 20:
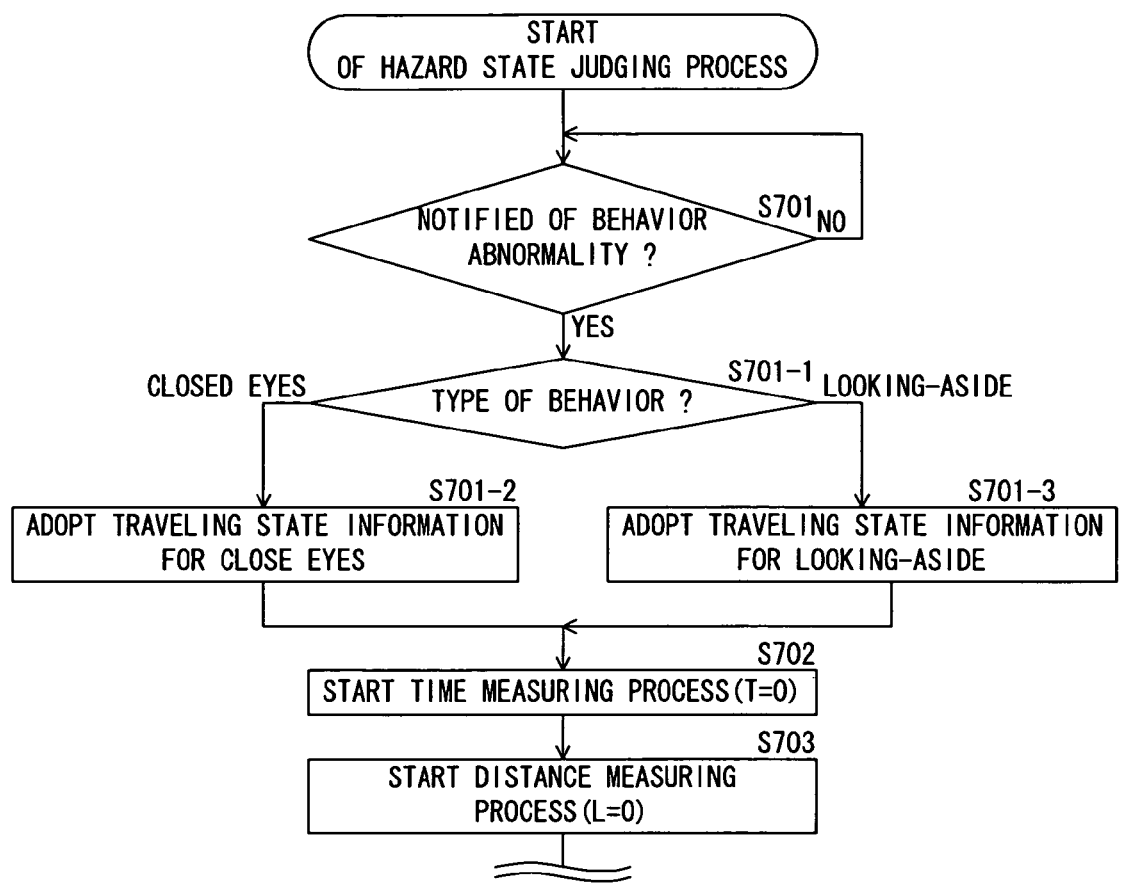
FIG. 20 is an explanatory flowchart showing part of the hazard state judging process in the on-vehicle unit of the alarm system in a second embodiment of the present invention.

Further, when the hazard state judging process in the first embodiment is, as shown in FIG. 14, notified of the behavior abnormality information from the behavior monitoring process (S701; YES), the CPU 60a immediately executes the time measuring process and the distance measuring process (S702, S703). In contrast, according to the second embodiment, when the hazard state judging process is, as shown in FIG. 20, notified of the behavior abnormality information from the behavior monitoring process (S701; YES), the CPU 60a judges whether the behavior abnormality information is about the closed eye or about the looking-aside (S701-1). If the behavior abnormality information is about the closed eye, the CPU 60a reads traveling state judging information for the closed eye from the ROM 60h (S701-2) and, if about the looking-aside, reads traveling state judging information for the looking-aside from the ROM 60h. Then, the CPU 60a, after reading the traveling state judging information for any one of these items, executes the time measuring process and the distance measuring process (S702, S703).

Note that the traveling state judging information connotes the combinations of the first through third upper limit time and the first through third upper limit distances explained referring to FIGS. 14 and 15, wherein the combinations thereof take different numerical values depending on the information for closed eye and the information for the looking-aside. These pieces of traveling state judging information for the closed eye and for the looking-aside are each stored beforehand on the ROM 60h.

Thus, according to the second embodiment, the hazard state judging process changes the traveling state judging information employed for judging the hazard state according to the type of the abnormal behavior that the behavior monitoring process notifies of. Therefore, the alarm system is capable of outputting the alarm both in the dozing-case and in the looking-aside case of the driver D.

Moreover, normally the danger is substantially higher when driving while dozing off than when driving while looking aside. Hence, if the condition to be set for the looking-aside case is more slackened than for the closed-eye case, the alarm system in the second embodiment can finely change the condition for judging that the alarm should be outputted in accordance with the hazard level.

Note that the first embodiment and the second embodiment discussed above have exemplified the automobile by way of one specific example of the vehicle, however, the vehicle is not limited to the automobile. The present invention can be applied to vehicles, other than the automobile, e.g., a truck, a two-wheeled vehicle (motorbike), a train, a ship, an airplane and so on.

Effects of the Invention

As discussed above, according to the present invention, the alarm can be exactly outputted when the danger actually rises.

What is claimed is:

1. An alarm system comprising:
    a behavior detecting module for detecting an abnormal behavior from behaviors of an operator sitting on an operation seat of a vehicle;
    a distance measuring module for measuring a moving distance of said vehicle while the abnormal behavior of the operator continues to be detected by said behavior detecting module;
    a hazard state judging module for judging that a state is a hazard state when the moving distance measured by said distance measuring module exceeds a threshold value; and
    an alarm output module for outputting an alarm when said hazard state judging module judges that the state is the hazard state.

2. An alarm system according to claim 1, further comprising a time measuring module for measuring an elapse time while the abnormal behavior of the operator continues to be detected by said behavior detecting module,
    wherein said hazard state judging module judges that the state is the hazard state in any one of a case where the elapse time measured by said time measuring module exceeds a threshold value and a case where the moving distance measured by said distance measuring module exceeds a threshold value.

3. An alarm system according to claim 2, wherein said distance measuring module includes a speed sensor for measuring a moving speed of the vehicle, and
the moving distance is calculated based on the moving speed measured by said speed sensor and on the elapse time measured by said time measuring module.

4. An alarm system according to claim 1, wherein said hazard state judging module has a multiplicity of threshold values different in their magnitude from each other with respect to the moving distance and, when judging that the state is the hazard state, specifies, from within a multiplicity of hazard levels, a hazard level corresponding to the magnitude of the threshold value exceeded by the moving distance, and
said alarm output module changes an output level of the alarm in accordance with the hazard level specified by said hazard state judging module.

5. An alarm system according to claim 2, wherein said hazard state judging module has a multiplicity of threshold values different in their magnitude from each other with respect to the moving distance and also a multiplicity of threshold values different in their magnitude from each other with respect to the elapse time and, when judging that the state is the hazard state, specifies, from within a multiplicity of hazard levels, a hazard level corresponding to the magnitude of the threshold value exceeded by the moving distance and specifies, from within a multiplicity of hazard levels, a hazard level corresponding to the magnitude of the threshold value exceeded by the elapse time, and further specifies the higher of the specified two hazard levels, and
said alarm output module changes an output level of the alarm in accordance with the hazard level specified by said hazard state judging module.

6. An alarm system according to claim 4 or 5, wherein said alarm output module counts the number, per unit time, of respective hazard levels specified by said hazard state judging module, and changes the output level of the alarm in accordance with the counted number.

7. An alarm system according to claim 1, further comprising:
a moving state detecting module for detecting values of at least three moving state elements of the vehicle; and
a vehicle state judging module for judging, based on the values of the respective moving state elements that are detected by said moving state detecting module, whether a state of the vehicle is a stable state or not,
wherein said hazard state judging module judges whether the state is the hazard state or not only when said vehicle state judging module judges that the state of the vehicle is the stable state.

8. An alarm system according to claim 7, wherein said moving state detecting module includes a speed sensor for measuring a moving speed of the vehicle, a longitudinal acceleration sensor for measuring a longitudinal directional component of acceleration of the vehicle, and a lateral acceleration sensor for measuring a lateral directional component of acceleration of the vehicle.

9. An alarm system according to claim 8, wherein said vehicle state judging module sets a case in which such a state that the moving speed is equal to or higher than a fixed value continues for a predetermined period of time, as one of conditions for judging that the state of the vehicle is the stable state.

10. An alarm system according to claim 8, wherein said vehicle state judging module sets a case in which such a state that the longitudinal directional component of the acceleration is equal to or lower than a fixed value continues for a predetermined period of time, as one of conditions for judging that the state of the vehicle is the stable state.

11. An alarm system according to claim 8, wherein said vehicle state judging module sets a case in which such a state that the lateral directional component of the acceleration is equal to or lower than a fixed value continues for a predetermined period of time, as one of conditions for judging that the state of the vehicle is the stable state.

12. An alarm system according to claim 8, wherein said vehicle state judging module sets a case in which such a state that the moving speed is within a range of a fixed value continues for a predetermined period of time, as a condition for judging that the state of the vehicle is not the stable state.

13. An alarm system according to claim 8, wherein said vehicle state judging module sets a case in which such a state that the longitudinal directional component of the acceleration is larger than a fixed value continues for a predetermined period of time, as a condition for judging that the state of the vehicle is not the stable state.

14. An alarm system according to claim 8, wherein said vehicle state judging module sets a case in which such a state that the lateral directional component of the acceleration is larger than a fixed value continues for a predetermined period of time, as a condition for judging that the state of the vehicle is not the stable state.

15. An alarm system according to claim 8, wherein said distance measuring module calculates a moving distance on the basis of a moving speed measured by said speed sensor of said moving state detecting module.

16. An alarm system according to claim 1, wherein said behavior detecting module, when detecting the abnormal behavior, specifies a type of the detected abnormal behavior, and
said hazard state judging module has a multiplicity of different threshold values corresponding to types of the abnormal behaviors, and, when judging the hazard state, adopts, from the multiplicity of threshold values, a threshold value corresponding to the abnormal behavior type specified by said behavior detecting module.

17. An alarm system according to claim 2, wherein said behavior detecting module, when detecting the abnormal behavior, specifies a type of the detected abnormal behavior, and
said hazard state judging module has a multiplicity of different threshold values corresponding to types of the abnormal behaviors with respect to the moving distance and also a multiplicity of different threshold values corresponding to types of the abnormal behaviors with respect to the elapse time, and, when judging the hazard state, adopts, from the multiplicity of threshold values, threshold values corresponding to the abnormal behavior type specified by said behavior detecting module with respect to the moving distance and the elapse time.

18. An alarm system according to claim 1, wherein said behavior detecting module has an imaging device for acquiring an image of the face of the operator as image data, and detects the behavior abnormality of the operator for every frame of the image data acquired from said imaging device.

19. An alarm control apparatus incorporated into a vehicle having an operation seat on which an operator sits when operating, and connected to a speed sensor for measuring a moving speed of the vehicle, an imaging device for imaging the operator and an output device, said alarm control apparatus comprising:

a behavior detecting module for detecting an abnormal behavior of the operator from image data acquired from said imaging device;

a distance measuring module for measuring a moving distance of the vehicle while the abnormal behavior of the operator continues to be detected by said behavior detecting module on the basis of the moving speed acquired from said speed sensor;

a hazard state judging module for judging that a state is a hazard state when the moving distance measured by said distance measuring module exceeds a threshold value; and an alarm output module for outputting an alarm to said output device when said hazard state judging module judges that the state is the hazard state.

20. A readable-by-computer medium stored with an alarm control program for making a computer incorporated into a vehicle having an operation seat on which an operator sits when operating, and connected to a speed sensor for measuring a moving speed of the vehicle, an imaging device for imaging the operator and an output device, execute:

a behavior detecting step of detecting an abnormal behavior of the operator from image data acquired from said imaging device;

a distance measuring step of measuring a moving distance of the vehicle while the abnormal behavior of the operator continues to be detected on the basis of the moving speed acquired from said speed sensor;

a hazard state judging step of judging that a state is a hazard state when the moving distance obtained by the measurement exceeds a threshold value; and an alarm outputting step of outputting an alarm to said output device only when judging that the state is the hazard state.

* * * * *